US007249037B2

(12) United States Patent
Koppes et al.

(10) Patent No.: US 7,249,037 B2
(45) Date of Patent: Jul. 24, 2007

(54) SYSTEM FOR MANAGING A STABLE VALUE PROTECTED INVESTMENT PLAN

(75) Inventors: Seth C. Koppes, St. Louis, MO (US); Edward J. Lanigan, St. Louis, MO (US); William A. Meier, St. Louis, MO (US); Richard M. Hurwitz, Wildwood, MO (US); Chris J. Garlich, Ballwin, MO (US); Mark A. Gilje, Crystal Lake Park, MO (US); Scott L. Fargo, Brentwood, MO (US)

(73) Assignee: Bancorp Services L.L.P., St. Louis, MO (US)

( * ) Notice: Subject to any disclaimer, the term of this patent is extended or adjusted under 35 U.S.C. 154(b) by 627 days.

(21) Appl. No.: 08/709,882

(22) Filed: Sep. 9, 1996

(65) Prior Publication Data

US 2004/0215493 A1    Oct. 28, 2004

(51) Int. Cl.
*G06Q 10/00* (2006.01)
(52) U.S. Cl. .................. 705/4; 705/705; 705/36 R
(58) Field of Classification Search ................ 705/2–4, 705/7, 34, 35, 36, 40; 364/710.04; 713/189, 713/193, 200, 201
See application file for complete search history.

(56) References Cited

U.S. PATENT DOCUMENTS

| 4,566,066 | A | 1/1986 | Towers |
| 4,642,768 | A | 2/1987 | Roberts |
| 4,648,037 | A | 3/1987 | Valentino |
| 4,674,044 | A | 6/1987 | Kalmus et al. |
| 4,722,055 | A | 1/1988 | Roberts |
| 4,750,121 | A * | 6/1988 | Halley et al. .................. 705/35 |
| 4,752,877 | A | 6/1988 | Roberts et al. |
| 4,774,663 | A | 9/1988 | Musmanno et al. |
| 4,839,804 | A | 6/1989 | Roberts et al. |

(Continued)

FOREIGN PATENT DOCUMENTS

JP       2002-686170    *   7/2002

OTHER PUBLICATIONS

Williams, Fred, "Stable value funds feature new twists", Pensions & Investments, Aug. 8, 1994, vol. 22, No. 16, p. 22 (abstract).*

(Continued)

*Primary Examiner*—Alexander Kalinowski
*Assistant Examiner*—Vivek Koppikar
(74) *Attorney, Agent, or Firm*—Davidson Berquist Jackson & Gowdey LLP

(57) ABSTRACT

Method and system to track, reconcile and administer the values of life insurance policies in separate accounts, including Stable Value Protected funds. Accordingly, targeted returns are translated into unit values on a daily basis for each fund. Additionally the system tracks restrictions (e.g., timing, amount of withdrawal and amount of reallocations) on a premium-by-premium basis, and tracks the book value, market value, duration and targeted return on a client-by-client basis. The system calculates and tracks the payments and credits applicable to a withdrawal or reallocation request, in addition to the liquidation schedules for each fund based on the payment amounts and credits of specific funds. Additionally, daily unit values are calculated given a periodic targeted return (i.e., a quarterly targeted return).

111 Claims, 15 Drawing Sheets

U.S. PATENT DOCUMENTS

| | | | |
|---|---|---|---|
| 4,933,842 | A | 6/1990 | Durbin et al. |
| 4,942,616 | A | 7/1990 | Linstroth et al. |
| 4,969,094 | A | 11/1990 | Halley et al. |
| 5,101,353 | A | 3/1992 | Lupien et al. |
| 5,126,936 | A | 6/1992 | Champion et al. |
| 5,193,056 | A * | 3/1993 | Boes .................... 705/36 |
| 5,214,579 | A | 5/1993 | Wolfberg et al. |
| 5,262,942 | A | 11/1993 | Earle |
| 5,291,398 | A | 3/1994 | Hagan |
| 5,414,838 | A | 5/1995 | Kolton et al. |
| 5,752,236 | A * | 5/1998 | Sexton et al. ............... 705/4 |
| 5,806,042 | A | 9/1998 | Kelly et al. |
| 5,999,917 | A * | 12/1999 | Facciani et al. ........... 705/36 |
| 6,343,272 | B1 * | 1/2002 | Payne et al. ............... 705/4 |

OTHER PUBLICATIONS

Clark, S E, "Stable Value Investments: A new force in 401(k) plans", Institutional investore, Aug. 1996, vol. 30, No. 8, pp. 89-94.*

Panko, Ron, "John Hancock unveils variable product portfolio enhancements", Best's Review, Jul. 1996, vol. 97, No. 3, p. 94.*

Peters, Catherine, "Metlife and UAM Investment Services introduce new line of defined contribution products", PR Newswire, Dialog file 635 (Business Dateline), No. 722413, 2 pages.*

Markland, Judy, "New and improved GICs keep insurers competitive", Best's Review, Jan. 1996, vol. 96, No. 9, pp. 76.*

Horn, Charles, "Accounting for guaranteed investment contracts: Will GAAP follow the regulatory view?", Bank Accounting & Finance, Winter 1996/1997, vol. 10, No. 2, pp. 30.*

Anonymous, "Market mix", National underwriter, Mar. 6, 1995, vol. 99, No. 10, pp. 25.*

"Mellon Completes Acquisition of Investment Management Business of Certus Financial Corp," PR Newswire, Jun. 6, 1995, From Dialog File 16 (The Gale Group), Accession No. 03887054.*

"Interest rate swings inspire new strategies," by Larry G. Mayewski et al.; Best's Review—Life-Health Insurance Edition, vol. 95, No. 9, p. 45, ISSN: 0005-9706, Dialog ID No. 07660287, From File 2 (Gale Group Trade & Industry Database).*

"The Eighth Annual Symposium—GICS '94 Creating Stable Value Portfolios in the New Product Age", The Institute for International Research, Apr. 24-27, 1994, Naples, FL.

"The Seventh Annual Symposium—GICS '93 Creating Stable Value Portfolios in the New Product Age", The Institute for International Research, Apr. 26-28, 1993, Scottsdale, AZ.

"The Sixth Annual Symposium—GICS '92", Institute for International Research, Apr. 27-29, 1992, Orlando, FL.

"GICS '96 the $10^{10}$ Anniversary Symposium on stable value investing", Institute for International Research, Apr. 21-24, 1996, Naples, FL.

"The 3rd Annual Symposium—GICS '89", Institute for International Research, Apr. 10-12, 1989, San Diego, CA.

"The 1993 GIC Association National Forum", International Business Forum, Mar. 8-9, 1993, Washington, DC.

"Risk Analysis of Actively Managed GIC Alternatives", Institute for International Research, Sep. 23, 1992, New York City, NY.

Stable Value Product Service Directory, 1995.

C. Jason Psome, "Synthetics Change Game; Traditional GIC Meets Its Match in 'Wrapped' Product", Pensions & Investments, Oct. 30, 1995, Section: News, p. 48.

Anthony G. Balestrieri, "New GIC products—and how to judge quality; guaranteed investment contracts; includes related article", Pension Management, Oct. 1995, vol. 31, No. 10, p. 28.

Jim Connolly, "Some Insurers Start Offering 'Pooled GIC' Plans", National Underwriter, Life & Health/Financial Services Edition, May 15, 1995, Section: Sales News and Trends, p. 8.

Joel Coleman, "Beware the 'wrap factor' in synthetic GICS; guaranteed investment contracts", Pension Management, Feb. 1996, vol. 32, No. 2, p. 48.

S.E. Clark, "A New Force in 401(k) Plans", Institutional Investor, Aug. 1996, Section: Stable Value Investments, p. S 89.

Judy Markland, "New and improved Gics keep insurers competitive.gauranteed investment contracts", Best's Review—Life-Health Insurance Edition, Jan. 1996, vol. 96, No. 9, p. 76 ISSN: 0005-9706.

Fred Williams, "Synthetics Helping Bond Managers", Pensions & Investments, May 27, 1996, Section: News, p. 36.

Fred Williams, "GIC Managers Charge North to Gain Business", Pensions & Investments, Feb. 19, 1996, Section: News, p. 26.

"The 4th Annual Symposium—GICS '90", Institute for International Research, Apr. 2-4, 1990, New Orleans, LA.

James F. McDevitt et al., "Plan Sponsor Product Preference Roundtable: Constructing the Perfect Stable Value Option", Apr. 23-26, 1995, Rancho Mirage, CA.

"The 1995 GIC Stable Value Association National Forum", Oct. 25-26, 1995, Washington, DC.

"Boli & Executive Benefits Roundtable '99", Feb. 18-20, 1998, Naples, FL.

"The Ninth Annual Symposium—GICS '95", The Institute for International Research, Apr. 23-26, 1995, Rancho Mirage, CA.

"Life Insurance Outlook", Moody's Investors Service, Sep. 1995.

"GIC Stable Value Major Players Symposium", Investment Management Institute, Mar. 8-10, 1998, New Orleans, LA.

MBIA Insurance Corporation, Structured Finance Group Brochure.

"3rd Annual GIC/Stable Value Major Players Summit", Investment Management Institute, Feb. 26-27, 1996, Palm Springs, CA.

"The 1993 National GIC Education Forum", The GIC Association, Mar. 8-9, Washington, DC.

"The 1994 GIC/Stable Value Association National Forum Attendee List", Oct. 17-18, 1994, Washington, DC.

"Eight Annual GIC Symposium", Investment Management Institute, Sep. 21-22, 1995, New York City, NY.

"GIC Stable Value Major Players Symposium—Insurance Industry Developments and Trends", Investment Management Institute, Mar. 8-10, 1998, New Orleans, LA.

"U.S. Life Insurance Industry Outlook", Moody's Investors Service, Nov. 1996.

"Trust GIC by the numbers", Providian Brochure, Mar. 31, 1995.

"GICs '95 Draws a Crowd", Stable Asset Commentary, Morley Capital Management, Inc., May 5, 1995, vol. 6, No. 5.

"Guaranteed Products Update" May 24, 1994.

David Emmes, "Public Enemy #1: The Truth About the 'D' Word", Apr. 25, 1995.

Michael Lewis, "The Lying Game", The New York Times Magazine.

William H. Gross, "Dale Carnegie in Bondland", Investment Outlook, Pacific Investment Management Company, Apr. 1995.

"TDSP—Tax Deferred Savings Plan", IBM, Jan. 1995.

Jeffrey H. Laderman, "The Peter Lynch of Bonds", BusinessWeek, May 16, 1994.

"Checklist of Key Issues to Consider When Purchasing Synthetic GICs", Bernstein.

"Playing It Safe With Singles", Newsweek, Jul. 4, 1994.

"TDSP—Tax Deferred Savings Plan", IBM, Apr. 1995.

"1997 GIC/Stable Value Major Players' Conference", Investment Management Institute, Feb. 20-21, 1997, Albuquerque, NM.

Kite, Chris W., "New OCC Guidelines for BOLI Ease the Buy", Sales News and Trends, Apr. 14, 1997.

http://www.mfcafe.com/pantry/bps_101298.html, "Stable Value Funds: registered Products and Share Classes for IRA Money".

http://www.Imstrategies.com/httoc~2.html, "Stable Value and GICs", Feb. 10, 2000.

http://www.Imstrategies.com/intro~2.html, "Introduction: The Origins of Stable Value", Feb. 10, 2000.

http://www.Imstrategies.com/types~2.html, "Types of Investment Contracts", Feb. 10, 2000.

http://www.dwight.com/library/gicback.html, "Background History of GICs", Feb. 10, 2000.

http://www.dwight.com/librarylif.htm, "Stable Value/GIC Market History and Overview", Feb. 10, 2000.

http://www.stablevalue.org/sv-archive.html, Stable Value Investment Association, Feb. 10, 2000.

Colemand, Joel L., "The Wrap Factor: Understanding How Investment Risks Affect Synthetic GIC Performance", Jan. 1996, pp. 1-24.

Barreto, Susan, "MetLife Alters Stable Value: Active Management, Wrapped Equities Distinguish New Approach", Pensions and Investments, Apr. 19, 1999.

"Stable Value News: MetLife Turns Up Heat in Stable Value Manager Role", DC Plan Investing, IOMA, Apr. 27, 1999.

"The 13th Annual Symposium on Stable Value Investing GICS '99", Scottsdale, Arizona, Apr. 25-28, 1999.

Wallace, Thomas L., "Alternative Strategies as Investment Options", Journal of the American Society_, Mar. 1999.

"A Unique Characteristic of Hedge Funds is Their Fee Structure, Which is Incentive-Based", Journal of Financial Service Professionals, Mar. 1999, pp. 89-92.

"What Does Winn-Dixie Mean for Other COLI Programs", Tax Notes, vol. 85, No. 6, Nov. 8, 1999, pp. 714-718.

Brostoff, Steven, "Stable Value Association on A Mission", National Underwriter, Life and Health/Financial Services Edition, Aug. 25, 1997.

Luddy, Thomas M., "Building a Global Investment Network", Association for Investment Management and Research, pp. 42-45.

JP Morgan Brochure dated Mar. 31, 1997.

White et al., James A., "Employers Take a Closer Look at GICs and Alternatives Amid Insurers' Woes", The Wall Street Journal, Money and Investment Section.

Norris, Jeffrey B., Memo to Marketing Representatives re: Insurance Company Separate Accounts.

OCC Bulletin from the Comptroller of the Currency Administrator of National Banks to CEO's, Department and Division Heads and all Examining Personnel of all National Banks re: Bank Purchases of Life Insurance, Sep. 20, 1996, pp. 1-13.

Beardsley, Samuel F., "Accountants Pay Important Role in GIC Industry", Pension World, Oct. 1990, pp. 16-18.

"Putnam Launches Guaranteed Return Product", Money Management Letter, Apr. 30, 1990, pp. 5 and 7.

Pulliam, Susan, "Improved GICs, Like Old Ones, Still Pose Some Risks", Wall Street Journal, Jan. 23, 1991.

"The Equity Index Product Advisory", Financial Distributors Inc.

Abbott, James T., "How Can My Company Get a Piece of the Big (and Rich) COLI Pie?", Reinsurance Report. Third Quarter 1993, pp. 13-18.

Connolly, Jim, "GUL Grows as Works Foot Benefit Costs", National Underwriter, Life & Health/Financial Services, Jul. 19, 1993, pp. 11, 20-21.

King, Carole, "M Financial, At 15, No Longer Alone", Bests Review, pp. 63-68.

Koco, Linda, "Aetna Raises Individual Life Profile", National Underwirter, Apr. 12, 1993, pp. 7, 9.

MetLife Brokerage, Broker World, Oct. 1992, pp. 130.

Woolley, Suzanne, "Look What Universal Life Begat", Business Week, Dec. 14, 1992.

Koco, Linda, "Two More Index UL Policies Make Their Debuts", National Underwriter, Mar. 10, 1997, pp. 9-10.

Sham, Lilia M., "Bridging the Annuity Gap", Emphasis, 1996, pp. 10-13.

Streiff, Thomas, "Equity Indexed Products Set to Sweep the Market", National Underwriter, Jul. 1, 1996, p. 16.

Koco, Linda, "A New Indexed Annuity Offers Index Averaging", National Underwriter, Jul. 8, 1996, pp. 25-26.

Koco, Linda, "Physicians Life Unveils 'Equity-Indexed' Annuity", National Underwriter, Jul. 8, 1996, pp. 7, 12.

"Innovations in Developing GIC/BIC Alternatives", Loews New York Hotel, Dec. 16, 1991.

Foley, Mark J., "An Introduction to Guaranteed Interest Contracts", pp. 1-77.

Fraade, Jon, "Stable Value COLI/BOLI Products", Stable Times, Second Quarter 1999, pp. 15-16.

"The 11th Annual Symposium on Stable Value Investing—GICS '97", Institute for International Research, Apr. 13-16, 1997.

Gallo, Victor A., "Evaluating GIC Product Alternatives", Monograph, No. 1, Sep. 1991.

Gallo, Victor A., "Separate Account GICS: One Solution for Today's GIC Market", Monograph, No. 3, May 1992.

"Guaranteed Interest Contacts: An Overview", Monograph, No. 5, 1992.

Haendiges, Brian K., "Separate Account GIC Alternatives", Monograph, No. 5, Jan. 1993.

Leach et al., Robert K., "Canadian Life Insurance Companies in the United States", Monograph, No. 10, Aug. 1993.

Markland, Judith, "Coping with the New Investment Options for Book Value Funds: A Primer for Plan Sponsors", Monograph, 1993.

Turco, Alfred A., "A "Common Sense" Guid to Alternatives and Synthetics: An Outline of Legal Issues", Monograph, Feb. 11, 1994.

Krebs, C. Robert, "Considering a Synthetic GIC?", Monograph, vol. 15, Aug. 1994.

Finegan, Steve G., "Reaching the TV Generation: The Use of Video in Your Media Mix", Monograph, No. 17, Oct. 1994.

Danco et al., Ty, "Evaluating GIC Performance", Monograph, Oct. 1994.

Ruthizer, Hal B., "Valuation of Credit Impaired Investment Contracts: The Case of Confederation Life Insurance Company", Dec. 1, 1994, pp. 1-9.

Vane, Bruce, "Considerations in the Evaluation of Impaired GIC Contracts" Monograph, No. 18, Feb. 1995.

Urette, Garrison, "GIC Discontinuance Provisions", Monograph, No. 19, May 1995.

Pasko, Dan, "The Pros and Cons of Structured Investment Contracts", Monograph, No. 21, Oct. 1995.

Gallo, Victor A., "Evaluating the Credit Risk of Alternative GIC Products", Monograph, No. 22, Nov. 1995.

Danco, Ty, "'Alpha' GICs: Synthetic GICs Without the Pitfalls", Monograph, No. 24, Feb. 1996.

Speciale, Mark P., "Alpha Synthetic GICs", Monograph, No. 25, Feb. 1996.

"The 3rd Annual Symposium—GICS '89, The Pension Industry Event on Maximizing Investment Opportunities in the $150 Billion Market", Apr. 10-12, 1989.

Durgin, Hillary, "Book Value Transfer a Model for Insurers", Pensions and Investments, Aug. 19, 1991.

Williams, Fred, "GICs Awash in Change", Pensions and Investments, Aug. 19, 1991.

"Synthetic GICs—The Basics", Prudential, pp. 1-5.

"The Met Managed GIC—A Proven Approach", MetLife.

Memo to Chris Garlich and John Swoboda re: proposal of Separate Account BOLI Accounting Solution Executive Summary, Dec. 27, 2001.

Letter to Jerry Facciani from Neil S. Chaffee re: Confidentiality Agreement, Jun. 22, 1995.

http://www.dwight.com/library/gicback.html, Gold, Jerry, "Background History of GICs", Dec. 11, 2001, pp. 1-5.

LifeCad Sample Reports by Beacon Software Development Company.

http://www.thehartfod.com/corporate/news_issues/1999ife/1991229.html, "Hartford Life Implements Policylink System to Upgrade Individual Life Insurance Administration", Connecticut, Nov. 16, 2001, pp. 1-2.

http://www.navisys.com/solutions/solution_home_admin.asp, Nov. 15, 2001, pp. 1-2.

http://www.navisys.com/pressroom/20000420.asp, New Jersey, Apr. 20, 2000, p. 1.

"IBC/Infoline's Second Conference on Enhancing Performance with GIC Alternatives The Stable Asset Option Within Defined Contribution Plans", New York, Jul. 27, 1993.

"GICs '91—The Fifth Anniversary Symposium", Institute for International Research, Phoenix, Arizona, Apr. 22-24, 1991.

Listing of all U.S. litigations involving U.S. patent No. 5,926,792 (child U.S. Appl. No. 09/157,096).

*Bancorp Services L.L.C.* v. *Hartford Life Insurance Co.*, United States Court of Appeals Federal Circuit, Appeal No. 03-1181, Decision decided Mar. 1, 2004, 69 USPQ2d 1996 (CA FC 2004), p. 1-12.

*Memorandum and Order, Bancorp Services, L.L.C.*, vs. *Hartford Life Insurance Company and International Corporate Marketing Group, Inc.*, Civil Action No. 4:00-CV-70 CEJ, United States District Court, Eastern District of Missouri, Feb. 13, 2002.

Order, *Bancorp Services. L.L.C.*, vs. *Hartford Life Insurance Company and International Corporate Marketing Group, Inc.*, Civil Action No. 4:00-CV-70 CEJ, United States District Court, Eastern District of Missouri, Feb. 14, 2002.

Order, *Bancorp Services. L.L.C.*, vs. *Hartford Life Insurance Company and International Corporate Marketing Group, Inc.*, Civil Action No. 4:00-CV-70 CEJ, United States District Court, Eastern District of Missouri, Feb. 15, 2002.

*Memorandum and Order, Bancorp Services, L.L.C.*, vs. *Hartford Life Insurance Company and International Corporate Marketing Group, Inc.*, Civil Action No. 4:00-CV-70 CEJ, United States District Court, Eastern District of Missouri, Feb. 25, 2002.

Verdict, *Bancorp Services, L.L.C.*, vs. *Hartford Life Insurance Company and International Corporate Marketing Group, Inc.*, Civil Action No. 4:00-CV-70 CEJ, United States District Court, Eastern District of Missouri, Mar. 15, 2002.

Opening Brief of Plaintiff-Cross Appellant, *Bancorp Services, L.L.C.* v. *Hartford Life Insurance Company and International Coporate Marketing Group, Inc.*, United States Court of Appeals, Appeal Nos. 02-1431, 03-1181, Mar. 31, 2003.

Reply Brief of Plaintiff-Cross Appellant Bancorp Services, L.L.C., *Bancorp Services, L.L.C.* v. *Hartford Life Insurance Company and International Corporate Marketing Group, L.L.C.*, United Sates Court of Appeals, Appeal Nos. 02-1431, 03-1181, Jun. 30, 2003.

Reply Brief of Defendants-Appellants Hartford Life Insurance Company and International Corporate Marketing Group, L.L.C., *Bancorp Services, L.L.C.* v. *Hartford Life Insurance Company and International Corporate Marketing Group, L.L.C.*, United States Court of Appeals, Appeal Nos. 02-1431, 03-1181, May 27, 2003.

\* cited by examiner

ALLOCATION SUMMARY ASSET GROUP

REPORT DATE: 8/17/95 2:10:03 PM

PROJECT NAME: CEMENT
SPONSOR NAME: XYZ MANUFACTURING     TOTAL LIABILITY: $11,097,301.80
PLAN GROUP NAME: GLOBAL WEALTH     TOTAL ASSET: $6,430,754.96

THE INCOME LINK     BENCHMARK 5%

| DATE | FUND NAME | LIABILITY | | ASSET | |
|---|---|---|---|---|---|
| 2/15/95 | PRIORITY BOND | $1,019,648.75 | 9.19% | | |
| 2/15/95 | SUPER LEVERAGED | $955,274.50 | 8.61% | | |
| 2/15/95 | INCOME & GROWTH | $1,317,666.56 | 11.87% | | |
| 2/15/95 | BALANCED | $1,958,238.09 | 17.65% | | |
| 2/15/95 | THE XYZ's FIXED INCOME | | | $1,923,315.03 | 30.05% |
| | | $5,250,827.90 | 47.32% | $1,932,315.03 | 30.05% → 17.27% |

BALANCE DIFFERENCE: $3,318,512.87

THE LIQUID LINK     BENCHMARK 5%

| DATE | FUND NAME | LIABILITY | | ASSET | |
|---|---|---|---|---|---|
| 2/15/95 | CRITICAL MONEY MARKET | $1,545,746.80 | 13.93% | | |
| 2/15/95 | SMALL GAINS | $1,455,964.06 | 13.12% | | |
| 2/15/95 | XYZ's LIQUID | | | $1,283,124.95 | 19.95% |
| | | $3,001,710.86 | 27.05% | $1,283,124.95 | 19.95% → 7.10% |

BALANCE DIFFERENCE: $1,718,586.91

THE STOCK FUND LINK     BENCHMARK 5%

| DATE | FUND NAME | LIABILITY | | ASSET | |
|---|---|---|---|---|---|
| 2/15/95 | MONSTER GROWTH | $878,480.78 | 7.92% | | |
| 2/15/95 | GROWTH | $1,966,282.36 | 17.72% | | |
| 2/15/95 | XYZ's SUPER GROWTH | | | $3,215,324.98 | 50.00% |
| | | $2,844,763.14 | 25.63% | $3,215,324.98 | 50.00% → 24.36% |

BALANCE DIFFERENCE: $370,561.84

TOTALS: $11,097,301.90     $6,430,764.96

*FIG. 5*

DEFINED BENEFIT ALLOCATION SUMMARY

| CURRENT CASH VALUE /140 | DEATH BENEFIT VALUE /142 | ESTIMATED LIABILITY /144 |
|---|---|---|
| $ 27,000 | $ 1,000,000 | $ 45,000 |

| BENCHMARK /146 |
|---|
| $ 10,000 |

*FIG. 8*

```
┌─────────────────────────────────────────────────────┐
│ CARRIER, ACCOUNT MANAGER, SVP WRITER, AND SUB-ADVISOR SELL │
│ "FEE UNITS" TO INVESTMENT MANAGER AT THE DAY'S INVESTMENT │──1304
│ UNIT VALUE. INVESTMENT MANAGER ADJUSTS THE NUMBER   │
│           OF INVESTMENT UNITS HELD BY EACH          │
└─────────────────────────────────────────────────────┘
                          │
┌─────────────────────────────────────────────────────┐
│ INVESTMENT MANAGER REMOVES THE VALUE OF THE "FEE UNITS" │
│ FROM THE UNDERLYING SECURITIES VALUE AND TRANSFERS CASH TO │──1308
│ THE CARRIER, ACCOUNT MANAGER, SVP WRITER AND SUB-ADVISER │
└─────────────────────────────────────────────────────┘
```

*FIG. 13*

```
┌─────────────────────────────────────────────────────┐
│ POLICY OWNERS SELL POLICY UNITS TO SYSTEM TO PAY FOR MONTHLY │
│ COST FOR INSURANCE (COI) FEES AND ADMINISTRATION FEES. SYSTEM │──1404
│ ADJUSTS THE NUMBER OF POLICY UNITS HELD BY THE POLICY OWNER │
└─────────────────────────────────────────────────────┘
                          │
┌─────────────────────────────────────────────────────┐
│ SYSTEM SELLS EQUIVALENT DOLLAR AMOUNT OF INVESTMENT UNITS. │
│ INVESTMENT MANAGER ADJUSTS THE NUMBER OF THE INVESTMENT │──1408
│           UNITS THEN HELD BY THE SYSTEM             │
└─────────────────────────────────────────────────────┘
                          │
┌─────────────────────────────────────────────────────┐
│       INVESTMENT MANAGER REMOVES THE VALUE OF THE   │
│       COI AND ADMIN. FEES FROM THE UNDERLYING SECURITIES │──1412
│          VALUE AND TRANSFERS CASH TO CARRIER        │
└─────────────────────────────────────────────────────┘
                          │
┌─────────────────────────────────────────────────────┐
│              SYSTEM CALCULATES ONGOING              │──1416
│             MORTALITY RESERVE ACTIVITY              │
└─────────────────────────────────────────────────────┘
```

*FIG. 14*

SYSTEM FOR MANAGING A STABLE VALUE PROTECTED INVESTMENT PLAN

BACKGROUND OF THE INVENTION

1. Field of the Invention

This invention relates to an automated system for tracking, reconciling and administering the values of life insurance policies in separate account, including stable value protected funds.

2. Discussion of the Background

For many years the majority of employee benefits have been funded through the purchase of stocks, mutual funds, corporate owned life insurance (COLI) and annuities. The value of these assets was generally provided on a quarterly or monthly basis, and the liabilities of these benefit plans have generally been made available on an annual or perhaps quarterly basis. Therefore, plan sponsors have had to wait six to twelve months for information about the current funded status of a benefit plan. In addition, changes in the tax code in the past few years have reduced benefits to highly compensated employees (HCE), that is, persons earning over $60,000 to $70,000 per year, as defined in the tax code.

In response to this decrease in benefits, companies are installing plans commonly known as Non-Qualified Deferred Compensation (NQDC) plans which offset some of the benefits being lost. By deferring money tax-free from employees and investing the deferred money in Elective Deferral Defined Benefit plans or Elective Deferral Defined Contribution plans, the NQDC plan helps employees regain lost benefits. Elective Deferral Benefit plans offer various fixed returns on the deferred salary (or other benefits) of an employee depending upon the amount of money deferred and the number of years the money is deferred. A deferral of a $1,000 will be used as an example. The plan promises a 7.5% return each year until the normal retirement age of 65. If the deferral is made at 64, then the maturity value is $1,075, and the balance is paid out in a lump sum. If desired, a participant may choose to retire early, at any age after turning 55. If a participant retires before age 65, the account balance promised at 65 is reduced by 7% for each year prior to age 65. If a participant leaves the company prior to attaining age 55, the participant is given the initial deferral plus a 5% interest credit for each year since the initial deferral. If a participant dies prior to retiring, the beneficiary receives the promised age 65 balance immediately.

Elective Deferral Defined Contribution plans work like investing in mutual funds. For example, when a deferral of $1,000 is made, the participant elects to invest his money in at least one of several funds sponsored by his employer. (Employers may offer several funds, e.g., a Bond fund, a Balanced fund, a fund which tracks the "Standard & Poor's 500" average minus a fixed percentage, etc.). At the time of deferral, the employee selects the Bond fund trading at $100/unit. The $1,000 is converted into 10 units based on the value of the fund on the day that the deferral is made. As the plan sponsor hold the liability for the employee/plan participant, the unit value is then adjusted daily to reflect the net value of the fund, plus any dividends or accruals paid. The value of the employee's investment is equal to the number of units multiplied by the unit value of the fund on the day of conversion. Therefore, if the per unit value of the Bond fund was $175, then the investment would be worth $1,750. Plan participants may also transfer deferred payments between Defined Contribution and Defined Benefit plans and between funds in the Defined Contribution plans.

However, the funds are hypothetical funds used to determine the return due to an employee and need not correspond to any real fund directly. For example, when a deferral is made to the bond fund, the plan sponsor may not actually choose to buy any funds relating to bonds, the plan sponsor may actually buy stocks, insurance policies or other annuities instead. The plan sponsor only promises to provide the return of the hypothetical fund (e.g., the rate of increase of the "Standard and Poor's 500" minus some fixed percentage, the real value of the "Standard and Poor's 500" minus some fixed dollar amount, etc.). In fact, in cases where an asset group is overfunded (i.e., the assets exceed the liabilities), the excess assets may be transferred to other under-funded plans.

Furthermore, the regulations that apply to these plans restrict the manner in which these plans can be funded. In essence, companies may not directly fund the liabilities created by these plans, whereas the companies can directly fund their qualified plans. Instead of providing direct funding, a plan sponsor invests the unsecured deferrals in financial instruments of the plan sponsor's choosing (e.g., mutual funds, variable policy insurance policies, etc.) to cover the liability corresponding to each participant's investment choices. Because plan sponsors may not actually be investing in funds similar to the funds requested by the plan participants, plan sponsors need to have more immediate access to information regarding their plans. This enables the sponsor to cover its liabilities by reallocating its assets as participants reallocate their assets. The volume and timeliness of information is critical to a successful NQDC plan, and the traditional methods of providing information quarterly or annually have proven to be unacceptable. Since plan sponsors are receiving information and changes on a daily basis, the chances of a mismatch between the values of plan assets and liabilities have traditionally been high. Finally, participants were previously largely uninformed as to the value of their deferred money and benefits. Participants traditionally received a statement once a year, with no projections, and little information as to how the benefit was calculated. The dearth of information available to sponsors and participants has caused many companies to avoid the use of NQDC plans, thereby denying participants a chance at benefit restoration.

In addition to NQDC plans, corporate owned life insurance policies are an efficient funding mechanism for employee benefits. The nature of COLI allows corporations to invest money in mutual fund-type investments and ultimately receive the growth on the investment tax free. Typically, corporations have had to account for this investment on a mark-to-market basis. This means that the underlying investments were valued at market each year and therefore were subject to the volatility of the investment. This has caused some corporations to avoid COLI purchases, even though as a long-term investment it is highly advantageous for corporations.

One solution to the above problem is to invest in a new and useful investment division known as a Stable Value Protected Investment. This investment smoothes the return associated with the underlying investment. For example, over the long term, the Standard and Poor's 500 may be expected to increase by 10% annually. However, during the long term, the annual returns may be +15%, −2%, +8%, −5%, etc. In order to smooth the returns, the investments in a Stable Value Protected Investment would create returns of 10%, 6%, 8%, 6%, etc. Over the long-term, the Stable Value Protected Investment would perform equal to the underlying investment, less the fee for the Stable Value Protection, but would provide smoothing along the way.

Another use for the Stable Value Protected Investment is to reduce the impact of initial fees associated with the purchase of COLI. First year fees include Premium Tax, Deferred Acquisition Cost (DAC) Tax and Sales Loads. The assessment of these fees has the effect of decreasing the corporation's return on its investment for the first few years. A solution to the initial decrease is to increase the return on the Stable Value Protected Investment initially, then use the smoothing nature of the Stable Value Protection in future years to "pay back" the initial increase. For example, the targeted return calculated by the Stable Value Protection writer may be increased by 3% for the first year, 2% for the second year and 1% for the third year in order to reduce the perceived impact of the first year expenses on the cash value of the policy.

The Stable Value Protected funds provide an initial targeted return for the first period of an investment. Upon completion of the first period, the value of the fund, the "market value," is compared with the "calculated" value of the fund which is the "book value." The "calculated" value of the fund is calculated by multiplying the initial value of the fund by (1+targeted return), wherein the targeted return for the next period is calculated using the formula:

$$TR=[(MV/BV)^{(1/D)} \times (1+YTM)]-1,$$

where CR is the targeted return, MV is the market value of a fund, BV is the book value of a fund, D is the duration of a fund and YTM is the current yield to market. The purpose of this calculation is to insure that the book value and the market value move closer together over a period of time, namely the duration of a fund. The targeted return is reached by investing in a security whose value fluctuates daily and whose purpose is to make up the difference between the actual return and the targeted return.

The duration of a fund was first described by Frederick A. Macaulay in *Some Theoretical Problems Suggested by the Movements of Interest Rates, Bond Yields, and Stock Prices in the United States Since* 1866, published by the National Bureau of Economic Research in 1938 and incorporated herein by reference. The duration of security provides a measure of both the coupon of a bond and the term to maturity. Macaulay showed that duration was a more appropriate measure of the time element of a bond than term to maturity because it takes into account not only the ultimate recovery of capital at maturity, but also the size and timing of coupon payments that occur prior to final maturity. Duration is defined as the weighted average time to full recovery of principal and interest payments, using annual compounding. Duration (D) is defined as:

$$D = \frac{\sum_{i=1}^{n} \frac{C_t(t)}{(1+i)^t}}{\sum_{t=1}^{n} \frac{C_t}{(1+i)^t}}$$

where t=the time period in which the coupon and/or principal payment occurs, $C_t$=the interest and/or principal payment that occurs in period t and i=the market yield on the bond. The denominator in the equation for duration is the price of an issue as determined by the present value model, and the numerator is the present value of all cash flows weighted according to the length of time until receipt. This concept of duration is also disclosed in ANALYSIS AND MANAGEMENT OF BONDS, Chapter 18— PRINCIPLES OF BOND EVALUATION, by Frank K. Reilly which is incorporated herein by reference.

Using the concepts of duration and targeted return, the actual performance of the underlying securities in the fund is smoothed over time. The funds are created on a client-by-client basis, and therefore each client is subject to its own past performance when its targeted return is calculated. Consequently, each client will have a different targeted return.

SUMMARY OF THE INVENTION

It is therefore an object of the present invention to overcome the disadvantages of the prior art systems.

It is another object of the present invention to provide a system capable of tracking and reporting assets and liabilities on a near real-time basis, a system that can project assets and liabilities into the future, and a system that makes the administration of NQDC plans simple, while keeping costs low for plan sponsors.

It is a further object of the invention to provide a system capable of tracking liabilities in both Defined Contribution and Defined Benefit plans.

It is a further object of the present invention to provide plan participants with timely access to plan information using modem, fax or automated voice response units.

It is yet another object of the present invention to provide plan sponsors with timely access to liability information by determining plan participants positions in the Defined Contribution and Defined Benefit plans.

It is yet another object of the present invention to provide plan sponsors with a means for calculating the liabilities of a Defined Contribution plan by contacting an external data provider by phone to determine the unit value of funds offered by the plan.

It is an additional object of the present invention to provide a means for the plan sponsors to determine plan assets by contacting external data sources to receive the values of insurance policies and financial instruments held by the plan sponsor.

It is an additional object of the present invention to provide a means for associating liabilities with assets and measuring an absolute dollar or percentage difference between the liabilities and their associated assets.

It is a further object of the present invention to provide a means of reporting to a plan sponsor that the assets and liabilities of a plan have values outside of a specified ratio or differential.

It is a further object of the present invention to provide a means of reconciling charges reported by an asset manager with internally calculated values for what the changes should be based on known transaction and management costs.

It is an object of the present invention to track, reconcile and administer the values of life insurance policies invested in separate accounts, including Stable Value Protected funds.

It is a further object of the present invention to provide a system to track, reconcile and administer life insurance policies in Stable Value Protected funds which smooth the return associated with the underlying investments and which amortize the initial fees associated with each premium payment over several years.

The above objects and other objects are achieved according to the present invention, by providing a computer system capable of tracking assets and liabilities for a NQDC plan stored in the computer system. The computer system determines the value of assets in the plan by calling an information warehouse (e.g., the Dow Jones Bulletin Board Service, insurance companies, investment companies, etc.) and requesting the current unit value of each asset held by the plan sponsor. The number of units of each asset times the value of each asset determines the current total asset value of the fund.

On the other hand, the total liabilities are calculated so they can be compared against the total assets. The total liability of a Defined Contribution plan is determined by multiplying the number of fund units held by plan participants in each fund by the unit values for the funds for that particular day. The number of fund units a participant buys when a user defers money is calculated in the computer system by converting the dollar amount of a user transaction (deferral, transfer among funds, realignment of fund allocation) into a number of fund units that the user can purchase for that amount on the day the transaction is made.

The current system draws on the teachings of actuarial statistics to estimate/predict statistically what assets are needed to cover incurred liabilities. Additional books covering the subject of actuarial statistics/mathematics are *Actuarial mathematics* by Newton L. Bowers, Jr., et al., *Society of Actuaries' textbook on life contingencies* by Chester Wallace Jordan, Jr. and *The theory of interest* and *Fundamentals of numerical analysis*, both by S. G. Kellison; the subject matter of the books is incorporated herein by reference.

The above objects relating to tracking, reconciling and administering the values of the life insurance policies in separate accounts, including Stable Value Protected funds, are achieved according to the present invention by providing a computer system for managing an insurance product purchase. According to the present invention, the targeted returns are translated into unit values (UV) on a daily basis for each fund. To perform these functions, the present invention calculates and stores, for each fund, the following: the fund duration, the portfolio allocation, the targeted return given the market value and duration of the fund, the current yield-to-market, and the stored book value. The invention further tracks restrictions (e.g., timing, amount of withdrawal and amount of reallocations) on a premium-by-premium basis, and tracks the book value, market value, duration and targeted return on a client-by-client basis. The invention also calculates and tracks the payments and credits applicable to a withdrawal or reallocation request in addition to the liquidation schedules for each fund based on the payment amounts and credits of specific funds. Additionally, the present invention calculates daily unit values given a periodic targeted return (i.e., a quarterly targeted return).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is a report showing a hypothetical set of assets and liabilities contained within a Deferral Defined Contribution plan and FIG. 5 also shows the tolerance parameters defined to indicate now closely the assets should correspond to the liabilities;

FIG. 8 is a report showing a hypothetical set of assets and liabilities contained within a Deferral Defined Benefit Plan;

FIG. 13 is a flowchart showing the operation of the present invention on a monthly basis;

FIG. 14 is a flowchart showing the operation of the present invention on a monthly policy anniversary basis;

DETAILED DESCRIPTION OF THE PREFERRED EMBODIMENTS

Figure 1:
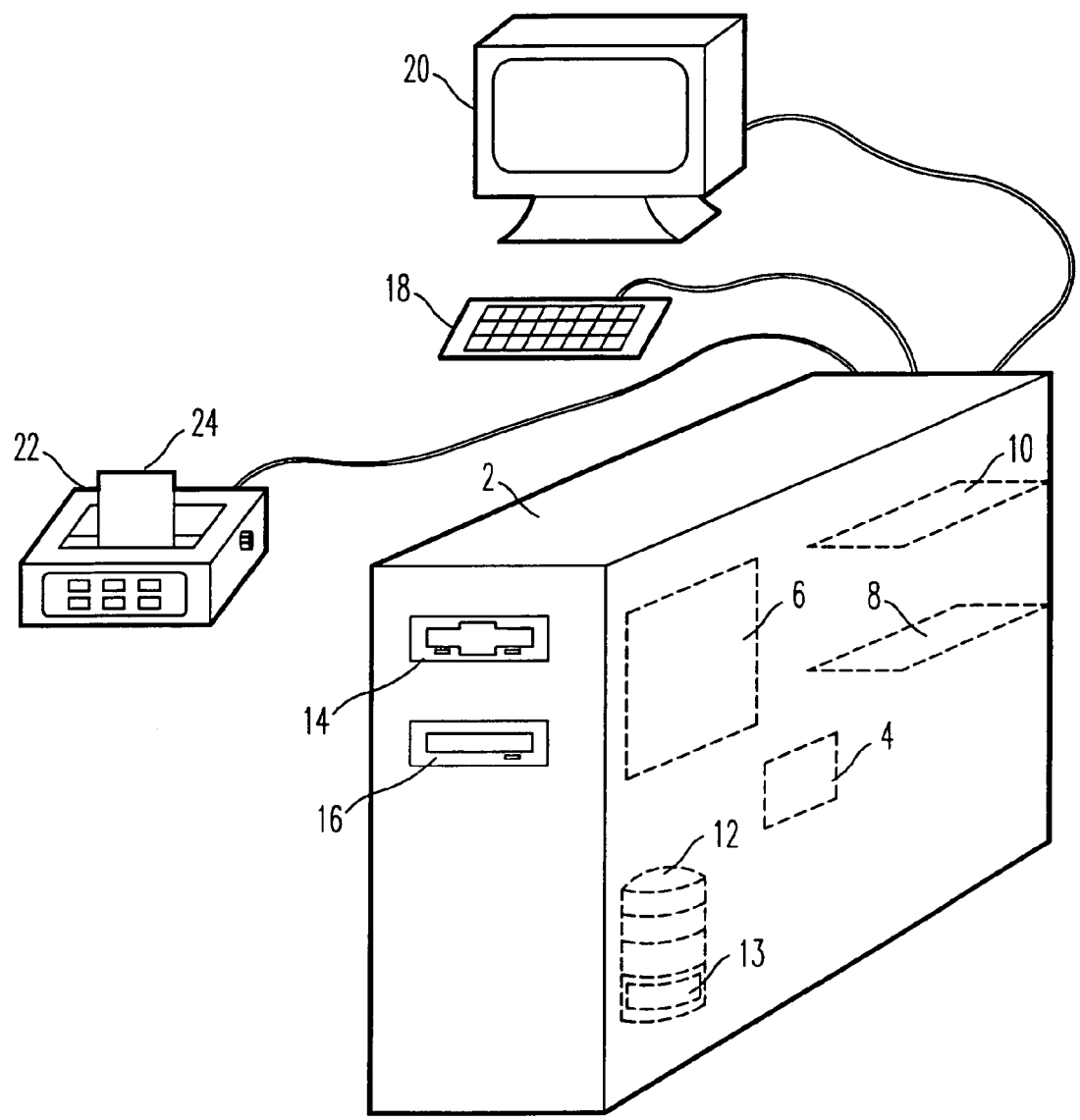
FIG. 1 is a layout diagram of the system according to an embodiment of this invention.

Referring now to the drawings, wherein like reference numerals designate identical or corresponding parts throughout the several views, FIG. 1 is a view showing an embodiment of the system of the present invention. Within a computer 2, there are provided: a central processing unit for a memory subsystem 6, a fax/modem card 8, an automated voice response unit 10, a digital storage means 12, a low density removable medium storage means (e.g., a floppy disk drive) 14 and a high density removable medium storage means (e.g., compact disc drive or tape drive) 16. Furthermore, keyboard 18 and monitor 20 are connected to the computer system 2 for inputting and outputting data, respectively. An additional printer 22 for printing reports 24 is also provided.

The heart of the computer system 2 is the central processing unit 4 which can comprise any one of the commercially available central processing units (e.g., Intel 80×86, Motorola 680×0, Power PC, etc.) to direct and coordinate the activities of the other components of the present system. The memory subsystem 6 comprises a combination of read only memory (ROM) and random access memory (RAM), and the memory's subsystem 6 stores commands to be executed by the central processing unit 4. Together the central processing unit 4 and memory subsystem 6 control the other devices of the system. A fax/modem, connects to a telephone line (now shown) to transfer information between the computer system and fund managers, insurance and annuity carriers, investment companies, plan sponsors and plan participants. The fax half of the fax/modem 8 additionally is used to send confirmations to plan participants when they make trades between funds or between the Defined Contribution and Defined Benefit plans. One such fax/modem that is commercially available is the Practical Peripherals 144FMT, whose technical manual and operations manual are incorporated herein by reference. The modem half of the fax/modem 8 sends and receives information from plan sponsors and participants' remote computers, by using an installed bulletin board service (BBS) program which runs on the computer system 2. The BBS program in an alternate embodiment is run on a second computer system 2 and exchanges information with the first computer system 2. In another alternate embodiment (not shown), the fax and modem are separate components of the computer system 2. In yet another embodiment, multiple fax/modems, fax-boards or modems are installed in the computer system 2 to provide connections to multiple plan participants or sponsors simultaneously.

The modem is additionally used to contact outside information providers and asset managers. In another embodiment of the present invention, the modem used to receive census data to update internal life expectancy and early retirement information that is used to calculate liabilities. Such information can be obtained from the U.S. Census Bureau.

The automated voice response unit (VRU) 10 likewise is connected to a telephone line (not shown) and is controlled by voice response unit control software. In an alternate embodiment, the VRU control software runs on a different computer and either shares information with the main computer system 2 or receives a snapshot of the data to use when providing information to plan participants and sponsors. Edify Corporation commercially provides such software under the tradename Electronic Workforce. Electronic Workforce runs on IBM compatible machines running OS/2 2.1 or later. Electronic Workforce also interacts with various databases on the digital storage means 12. In an alternate embodiment, a combination of fax/modem 8 and an automated response unit 10 are used to provide the requested information. By using the automated response unit 10, a plan sponsor or participant requests information from the computer system 2. The requested information then is faxed using the fax/modem 8 to a number entered into the automated response unit 10 when the information was requested. This enables the delivery of reports on a near real-time basis.

Digital storage means 12 also is used to store both programs (e.g., operating systems and user applications) and a database 13. The programs are loaded from the digital storage means 12 into the memory subsystem 6, and they are then executed by the CPU 4. The database 13 of information describes the assets and liabilities managed by the present invention. Currently available commercial databases such as DB2/2 for OS/2, Microsoft Access for Windows and Oracle's SQL server are suitable for storing asset and liability information. Their corresponding Users Manuals are incorporated herein by reference. Additional programs and information can be written to the digital storage means 12 having been read from the low density removable medium storage means 14 and high density removable medium storage means (e.g., compact-disc) 16 or having been transmitted the computer system 2 via the fax/modem 8 or the automatic voice response unit 10. The present invention further includes a computer readable media (e.g., high density removable storage means 16) for controlling a computer to manage a non-qualified deferred compensation plan. As is well known, a keyboard 18 additionally is used for entering data into the computer systems, and a computer monitor 20 is used to display both graphical and textual information from the computer systems. A printer 22 prints reports 24 showing plan sponsors and participants their present positions, including any positions of plan sponsors which vary outside of predetermined ranges.

Figure 2A:
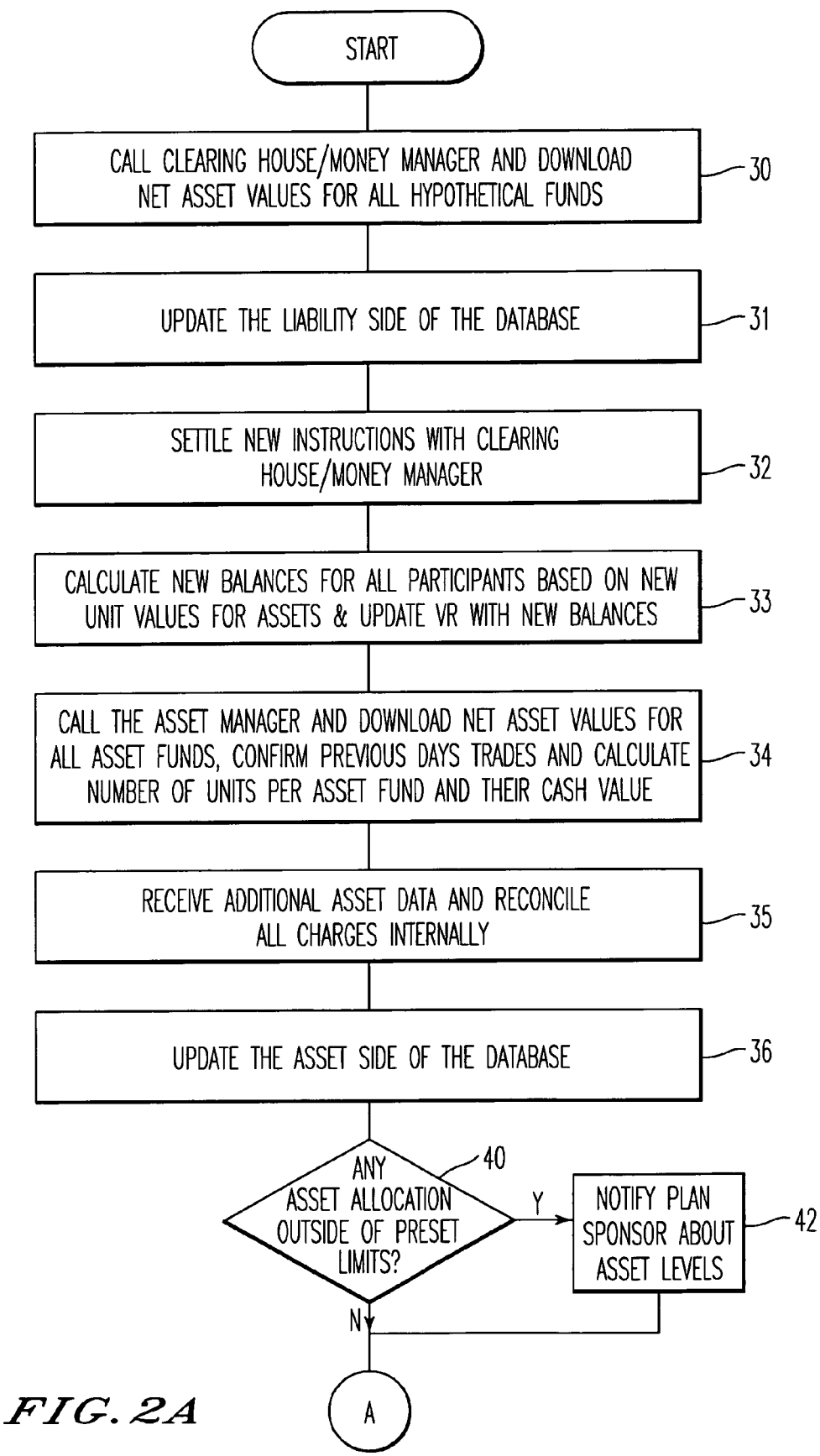
FIGS. 2A and 2B are flowcharts of the daily operation of the system of the present invention.
Figure 2B:
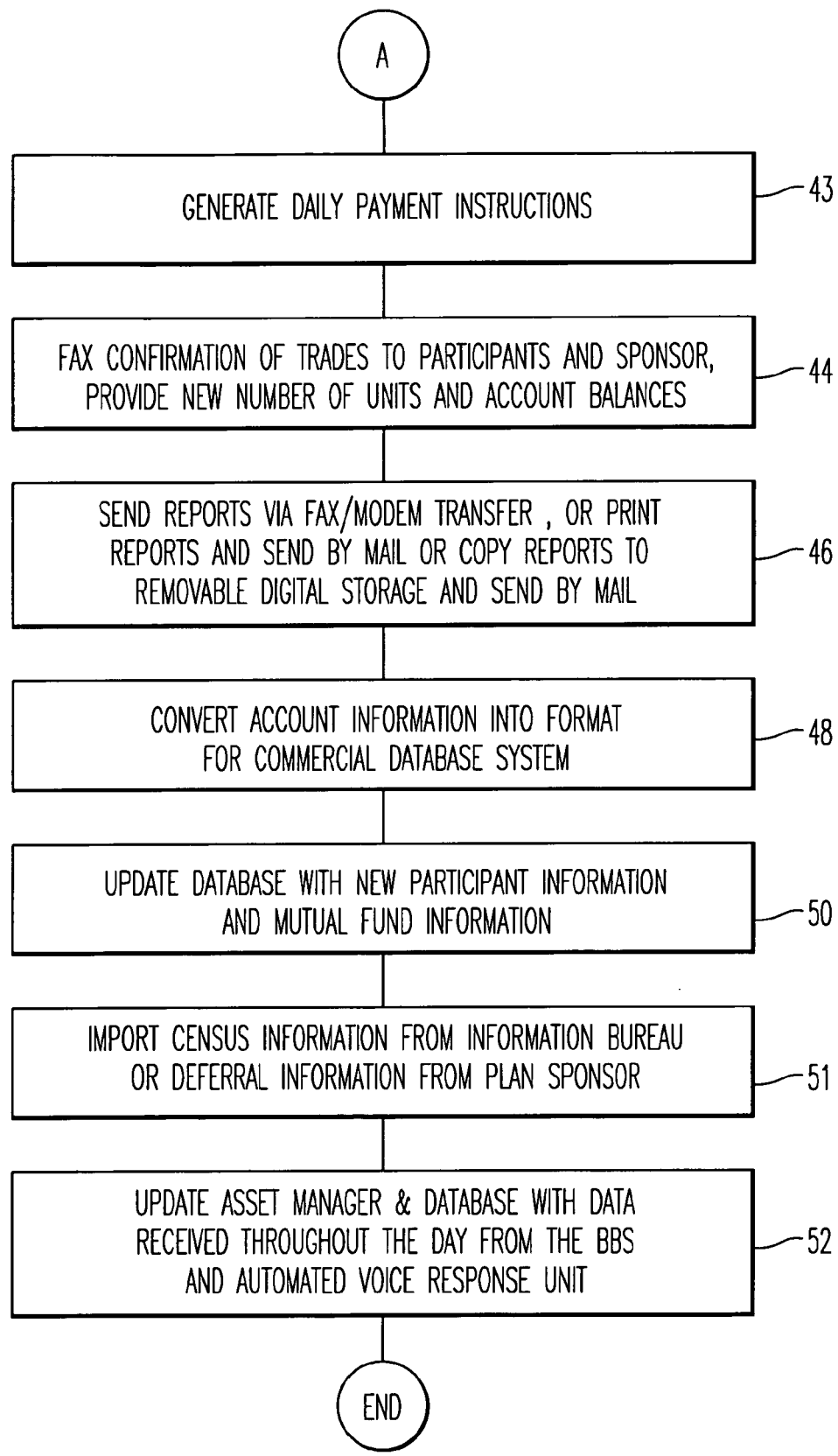

Moving now to FIGS. 2A and 2B, the operation of the system will be described in terms of a daily schedule. In the morning, the computer system 2 performs step 30 and uses the fax/modem 8 to call an information provider (e.g., the Dow Jones Bulletin Board Service, an investment clearinghouse, a money manager, etc.) and downloads the previous night's net asset values for all hypothetical funds provided by the plan sponsor in the Defined Contribution plan (i.e., "Standard & Poor's 500", Stock and Bonds). In step 31, the downloaded information is used to update the liability side of the database stored on the digital storage medium 12. In step 32, outstanding plan sponsor buy and sell instructions are settled with the appropriate clearing houses by sending requests made by the plan sponsor from the computer system 2 to the clearing houses. These requests keep the plan sponsor's asset allocation matched to the participants' liability allocations. Steps 30 and 32 will be shown in FIGS. 4 and 7 in more detail. In step 33, new balances are calculated for each participant based on the per unit values downloaded from the information providers. These balances are provided to the VRU control software to enable the VRU to provide balance information to plan participants and sponsors. Although the data is a snap-shot of a participant's position, the snap-shot can be updated as frequently during the day as desired in order to reflect changes caused by trades, etc. The computer system, in step 34, then calls the Asset Manager and downloads the previous night's net asset values for all asset funds, confirms the previous day's trades and calculates a number of units per asset fund and their cash values. In step 35, additional data on charges incurred by the plan sponsor to cover management of funds and trade costs are also downloaded, and the downloaded values are reconciled with internal calculations of what the changes should be. The computer system 2 then updates the asset side of the database 13 for the Defined Contribution and Define Asset plans, in step 36. Steps 34 and 36 are shown in more detail in FIGS. 3 and 6 for the Defined Contribution and Defined Benefit plans, respectively. In step 40, the assets and corresponding liabilities are compared with preset limits to determine if the asset allocation indicates that the differences are beyond preset limits. If any allocations are outside of their limits, the plan sponsor is notified in step 42 about the current asset levels. Whether the plan sponsor is notified or not, the system continues with normal processing in step 43. Step 43 generates any daily payment instructions which would enable a plan participant to receive benefits from either the Defined Contribution or Defined Benefit plans. To keep plan participants informed about their investments, in step 44 fax confirmation of trades are sent to participants; the faxed information provides the participants' new numbers of units and account balances. To keep plan sponsors informed about the status of the offered plans, fax confirmations of plan participant trades are also sent to the plan sponsor in step 44. Electronic reports showing asset and liabilities for each asset group are sent monthly via fax/modem transfer to plan sponsors that can receive such information, and printed reports and copies of reports on removable digital storage are sent by mail in step 46 to other plan sponsors. In step 46, at the end of a day's transactions, the account information is converted into a format for a commercial database system, and the database is updated with new participant information and mutual fund information in step 50. To help with calculating liability in the future and to calculate expected returns, census and other information can be retrieved from remote sources in step 51 and stored into the database 13. In addition, the asset manager and database 13 are updated in step 52 with data received throughout the day from the Bulletin Board Service and the automated voice response unit 10.

Figure 3:
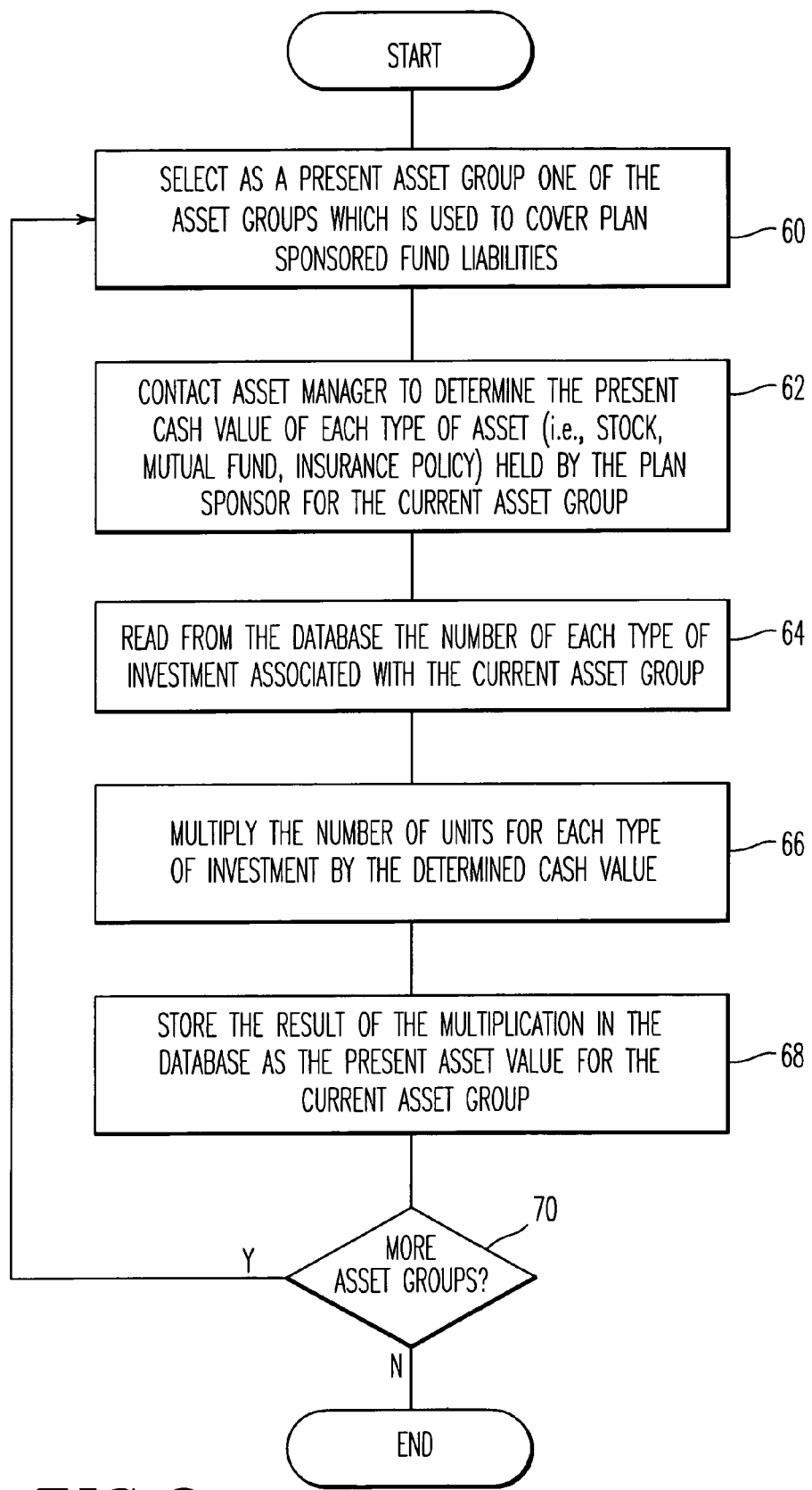
FIG. 3 is a flowchart showing how current assets are updated for Defined Contribution plans.

The flowchart of FIG. 3 depicts one implementation of how the current assets are calculated in the computer system of the present invention for Defined Contribution plans. A first asset group is read in step 60 from a list of asset groups stored in a database 13 on the digital storage means 12. The asset manager is then contacted in step 62 to determine the present cash value of the assets (i.e., stocks, mutual funds, annuities) held by the plan sponsor which are linked to the first asset group. In step 64, the number of each type of investment is also read from the database 13. The number of units of each asset is multiplied by the corresponding unit value to create a value of the assets held. In the next step, step 68, the asset value stored in the database 13 is updated with the calculated value so that it can be compared with the corresponding liabilities of the asset group, as was explained for step 40. This process of updating and storing asset values for an asset group is performed for each uncalculated asset group if step 70 determines that some asset groups have not been updated.

Figure 4:
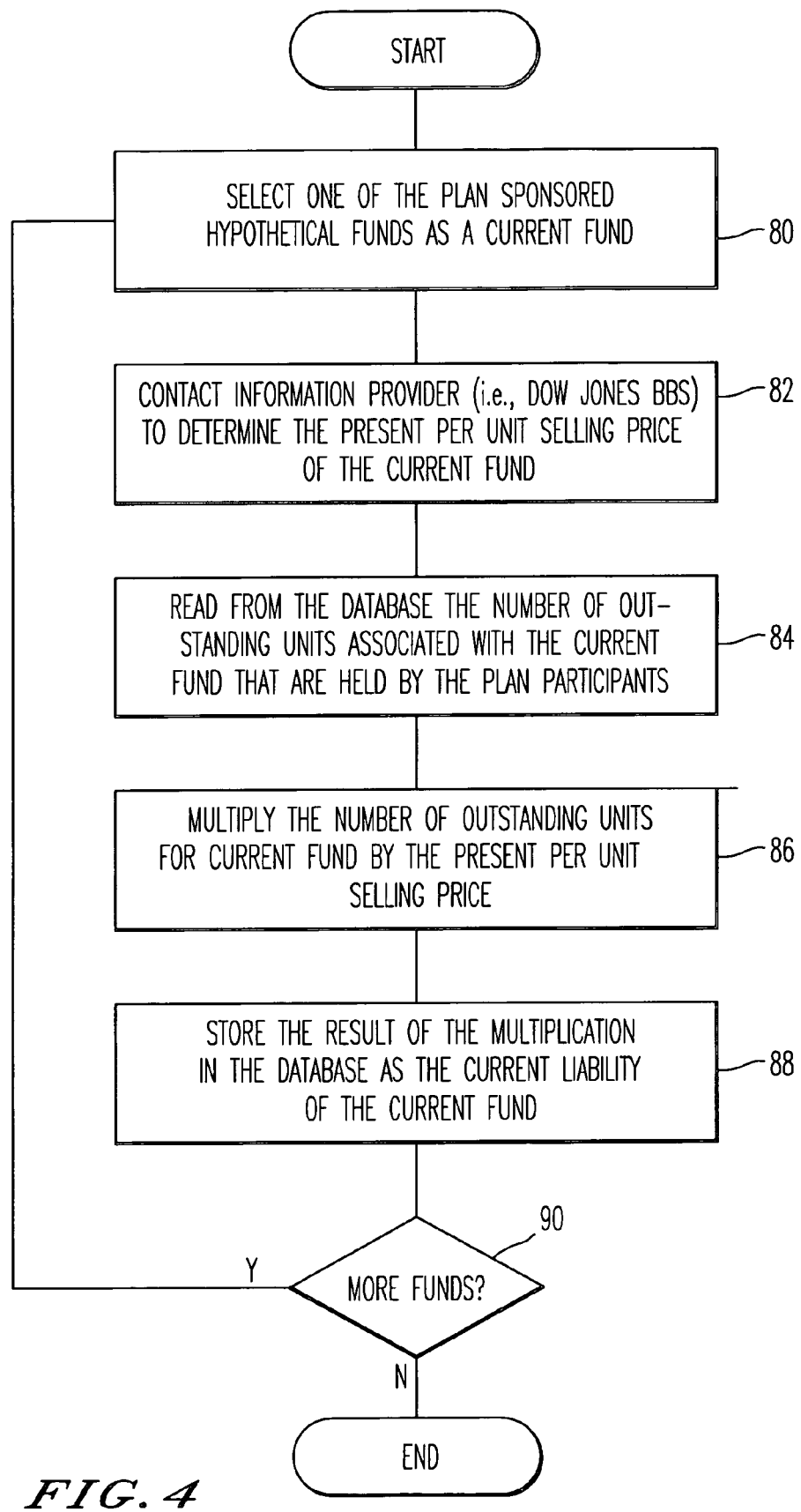
FIG. 4 is a flowchart showing how liabilities are updated for an Elective Deferral Defined Contribution plan.

The flowchart of FIG. 4 depicts a method of calculating the liability of deferrals for each hypothetical fund in an asset group for Defined Contribution plan as was performed in steps 30 and 31. In step 80, the computer system selects, from the database 13 stored on the digital storage means 12, one of the hypothetical funds being offered by the plan sponsor as a current fund. In step 82, the computer system uses the fax/modem to contact an information service provider to determine the current selling price of the current hypothetical fund offered by the plan sponsor. In step 84, the number of outstanding units for the current hypothetical fund is read from the database 13. This number of units is multiplied in step 86 by the current per unit selling price of the current hypothetical units to determine the present liability of the Defined Contribution plan for the current fund. Step 88 stores the calculated value in the database 13 to be compared in step 40 with a corresponding asset value. Step 90 continues the updating process again at step 80 if there are more funds which have not been updated. When all funds have been updated, step 90 ends the updating process.

The report of FIG. 5 is an Allocation Summary for a Defined Contribution plan showing how three sets of assets in an asset group are linked to their corresponding funds. As an example of a fund link 100, the Income Link has an asset 102 indicated by the name "the XYZ's fixed income" with a current value of $1,932,315.03, which is 30.05% of the asset group's total assets. This asset is used to secure a plan sponsor's position for four funds 104: Priority Bond, Super Leveraged, Income & Growth and Balanced, totaling $5,250,827.90, which constitutes 47.32% of the liability for the whole asset group. The benchmark 106 for the fund link 100 is shown as 5%; therefore, a report will be generated and sent to the plan sponsor to indicate that the current liability of 47.32% of the fund link is not within 5% of the current asset allocation of 30.05% of the fund for the defined asset group. In this way, the dollar value of an asset for a fund link need not match the dollar value used to secure the liabilities of a fund link. As long as the percentage allocation of total assets for a link match the percentage allocation of total liabilities for the link, the link is considered to be within the benchmark. In this way, if the liability of an asset link of an asset group grows, the corresponding assets of the asset group can grow proportionally.

Figure 6:
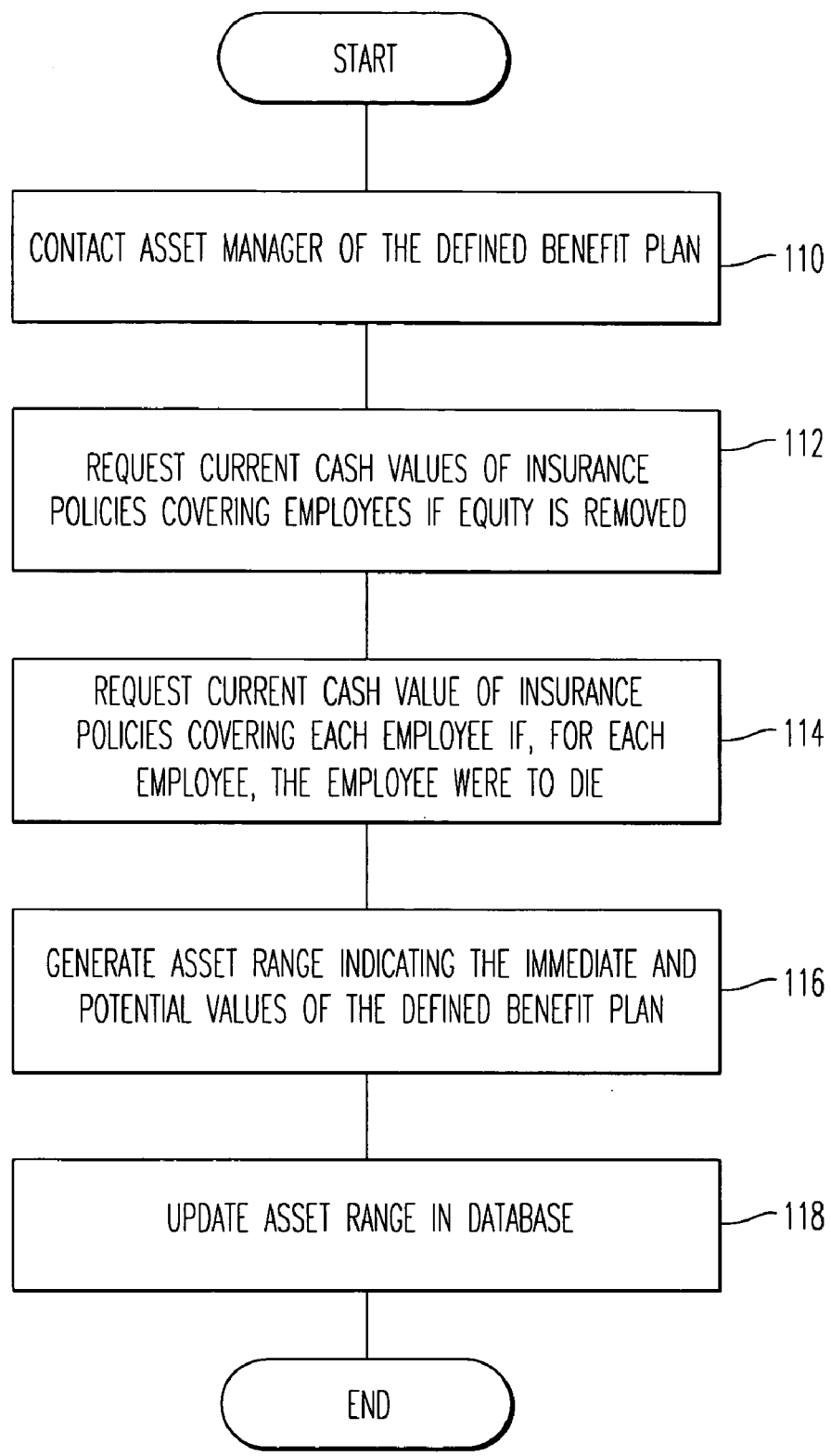
FIG. 6 is a flowchart showing how current assets are updated for a Defined Benefit plan.

The flowchart of FIG. 6 shows how the insurance policy asset values of an Elective Deferral Defined Benefit plan are updated in the present system. The computer contacts the asset manager of the Defined Benefit plan in step 110, and in step 112 requests the current cash values of insurance policies covering employees if the equity were to be removed on the current day. In step 114, the computer further requests the current cash value of each policy to determine the value of the policy if each employee were to die. Using the information of steps 112 and 114, the computer system generates an asset range in step 116 which indicates the immediate and potential values of the Defined Benefit plan based on the outstanding insurance policies held by the plan sponsors. The asset range is then stored in the database 13 so the asset value can be compared with the Defined Benefit Liability to determine if there is a mismatch in fund allocation.

Figure 7:
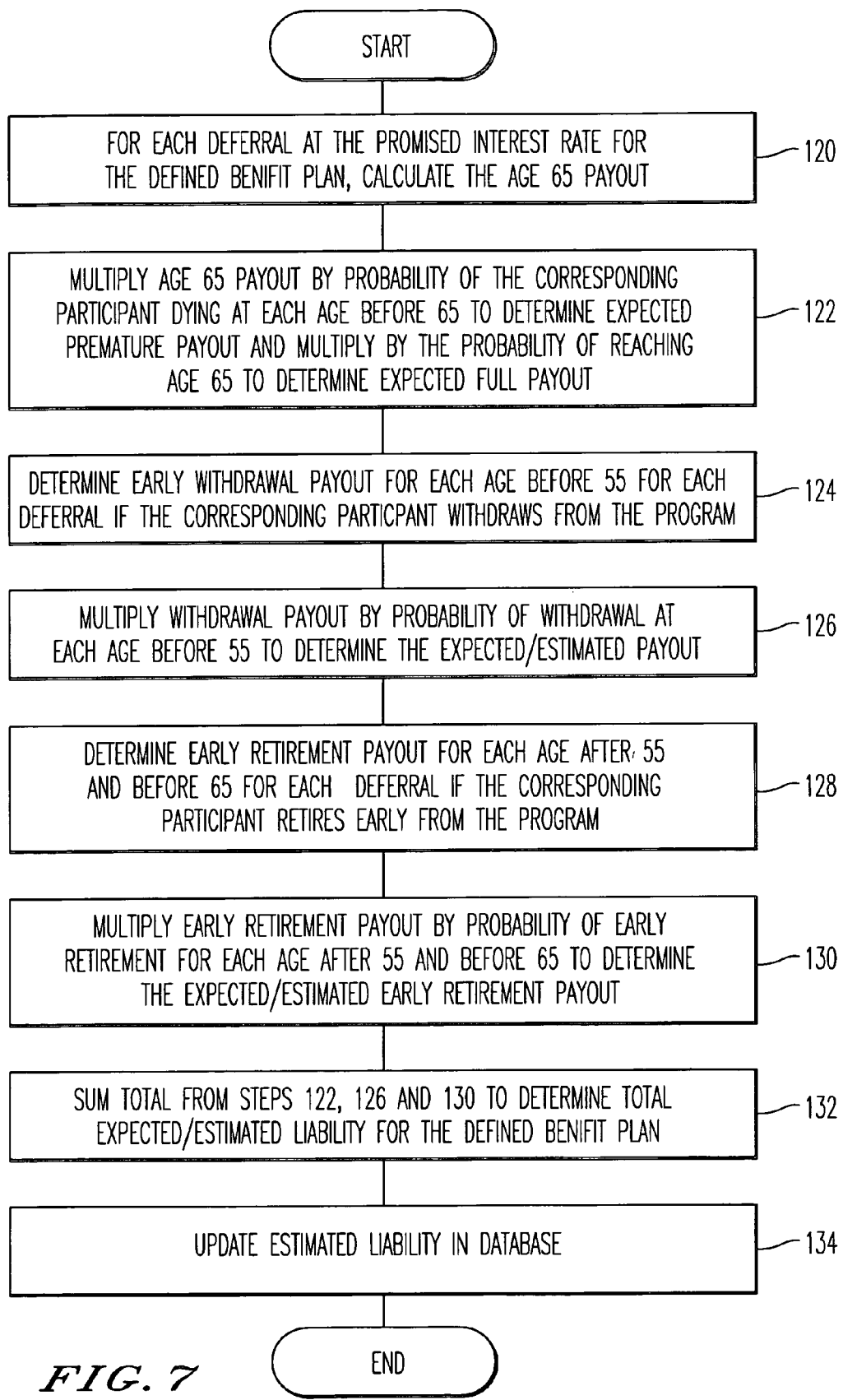
FIG. 7 is a flowchart showing how estimated liabilities are updated for an Elective Deferral Benefit plan.

The flowchart of FIG. 7 depicts how estimated liabilities are calculated for an Elective Deferral Defined Benefit plan as was performed in steps 30 and 31. The liability is calculated as an estimated liability based on the probabilities of dying, withdrawing or retiring at each age up to age 65. In the first step of computing an estimated liability, step 120, the computer system determines the payout for each deferral for a given interest rate if the corresponding participant removes his money at age 65. The payout at age 65 is also the payout should the plan participant prematurely die before removing his money. In step 122, the age 65 payout is multiplied by the probability of the corresponding participant reaching age 65, thus calculating an expected full payout. Likewise, the age 65 payout is multiplied by the probability of the corresponding participant dying at each age before 65 to determine an expected premature payout. In step 124, the computer system determines the payout for each age before 55 for each deferral if the corresponding participant withdraws from the program. By multiplying in step 126 the withdrawal payout by the probability of withdrawal at each age before age 55, an early withdrawal payout is calculated. Furthermore, in step 128 an early retirement payout is calculated for each age after 55 and before 65 of a corresponding participant for each deferral. The early retirement payout is multiplied in step 130 by the probability of early retirement for each age after 55 and before 65 to determine the expected/estimated early retirement payout. In step 132, all expected payouts are summed to determine a total expected/estimated liability for the Defined Benefit plan. This value is updated in the database 13 in step 134.

The report of FIG. 8 shows a current cash value of a Defined Benefit plan as calculated in FIGS. 6 and 7. The current cash value 140 is determined in FIG. 6, step 112, whereas the death benefit value is calculated in FIG. 6, step 114. The estimated liability 144 is calculated according to the method of FIG. 7, with the final result being stored in step 134 of FIG. 7. In addition, because the benchmark 146 for the Defined Benefit plan is indicated to be $10,000, the computer system, when implementing the process of FIG. 2A, would determine that an asset allocation is outside of preset limits in step 40 and notify the plan sponsor about the asset level using step 42.

Figure 9:
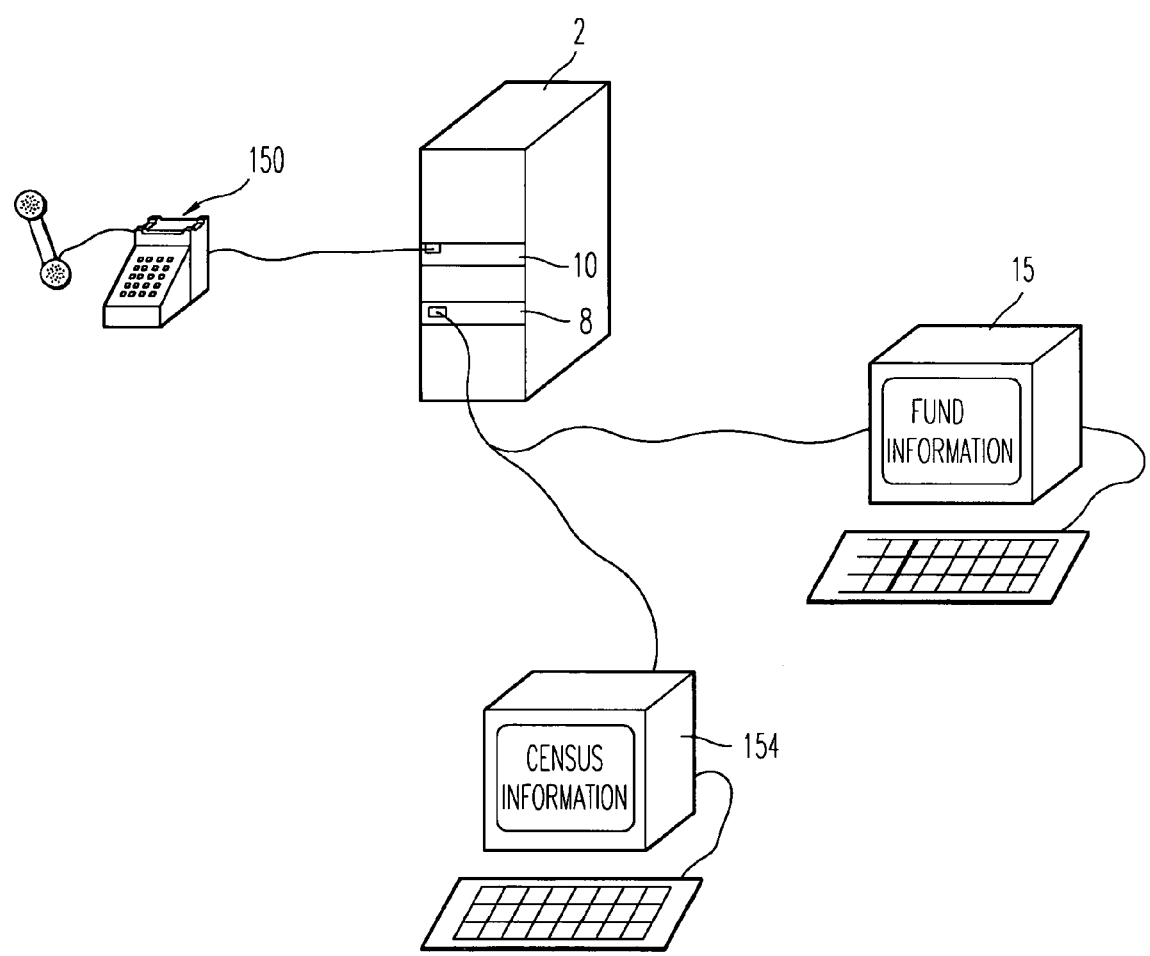
FIG. 9 is a schematic showing devices for remotely receiving information from the present invention by using a telephone as an input/output device or by using a terminal/computer as the interface to the computer system across a telephone line.
Figure 10:
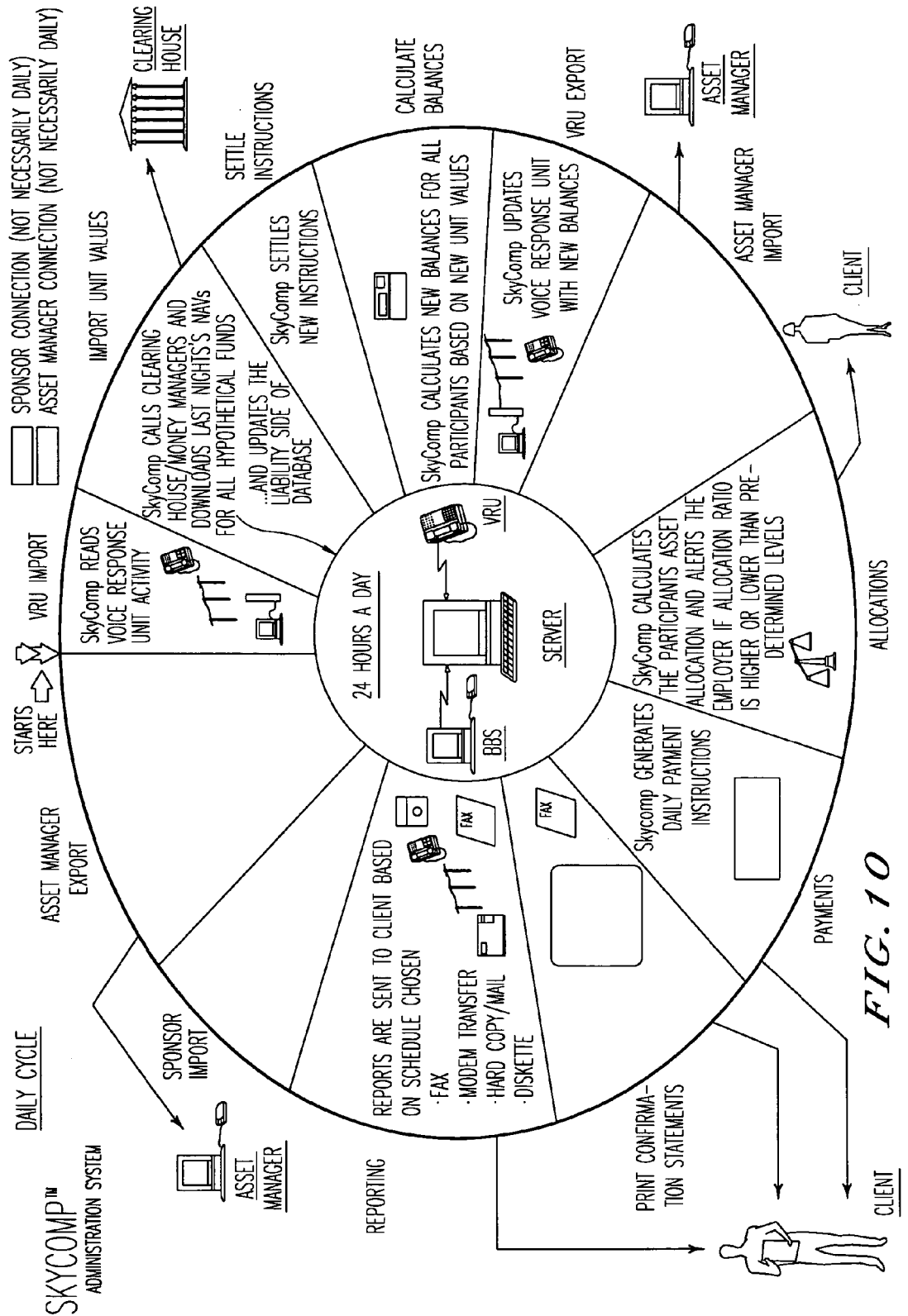
FIG. 10 is a graphic illustration of the processing cycle used by the present application for NQDC plans.

As shown in FIG. 9, deferrals and changes to a plan participant's funds can be made remotely using a telephone 150 or a computer terminal 152. Likewise, the plan sponsor can get information about the status of asset groups using the telephone 150 or the computer terminal 152. When connecting to the computer system 2 using the telephone 150, a plan participant or sponsor is audibly provided with a series of choices in a menu. The plan participant or sponsor responds to the menu items using the keypad on the telephone 150. Illustrative remote operations which can be performed by plan participants using the telephone 150 include checking the current value of deferrals, trading units between funds in a Deferral Defined Contribution plan, requesting projections about the future value of investments and requesting historical information on plan performance over a period of time. Illustrative remote operations that can be performed by the plan sponsor using the telephone 150 are checking current asset values in an asset group, checking unit values for hypothetical funds linked to the assets in the corresponding asset group, determining the total liability of each hypothetical fund in the corresponding asset group and calculating if the values of the liabilities and assets are within the range specified by the benchmark.

Using the computer terminal 152 to correct to the fax/modem 8, the plan participant or sponsor likewise receives information from the computer system 2. The information is displayed on the monitor of the computer terminal 152 and data to be sent to the computer system 2 is input using the keyboard of the same computer terminal 52. Unlike the menu system of the telephone 150, the computer terminal 152 displays a series of prompts (i.e., menus, dialogue boxes, input screens) for the plan participant or sponsor instead of prompting using voice commands. Informational responses are sent from the computer terminal 152 to the computer system 2. The computer system 2 responds to requests by the plan participants or sponsor by sending a reply from the fax/modem 8 across the telephone wire, and the results are displayed on the monitor of the computer terminal 152. The computer terminal 152 can either be a stand-alone or networked computer, capable of general purpose computing but running software to connect to the computer system 2, or a "dumb" terminal, only capable of terminal interactions. In another embodiment where the terminal is a stand-alone or networked computer, prompts from the computer system are converted from text to speech by the computer terminal and voice recognition software converts voice responses of the plan participant or sponsor into text to be sent to the computer system 2.

Additional information to help calculate liabilities and assets may be received from remote terminals and information resource providers 154 (i.e., the U.S. Census Bureau and insurance/actuarial data providers) as in step 51. This information is used to update the database 13 and change the values used in steps 122, 126 and 130. Received information (i.e., economic indicators) is used in another embodiment to help plan sponsors predict the value of assets and liabilities in the future.

Figure 11:
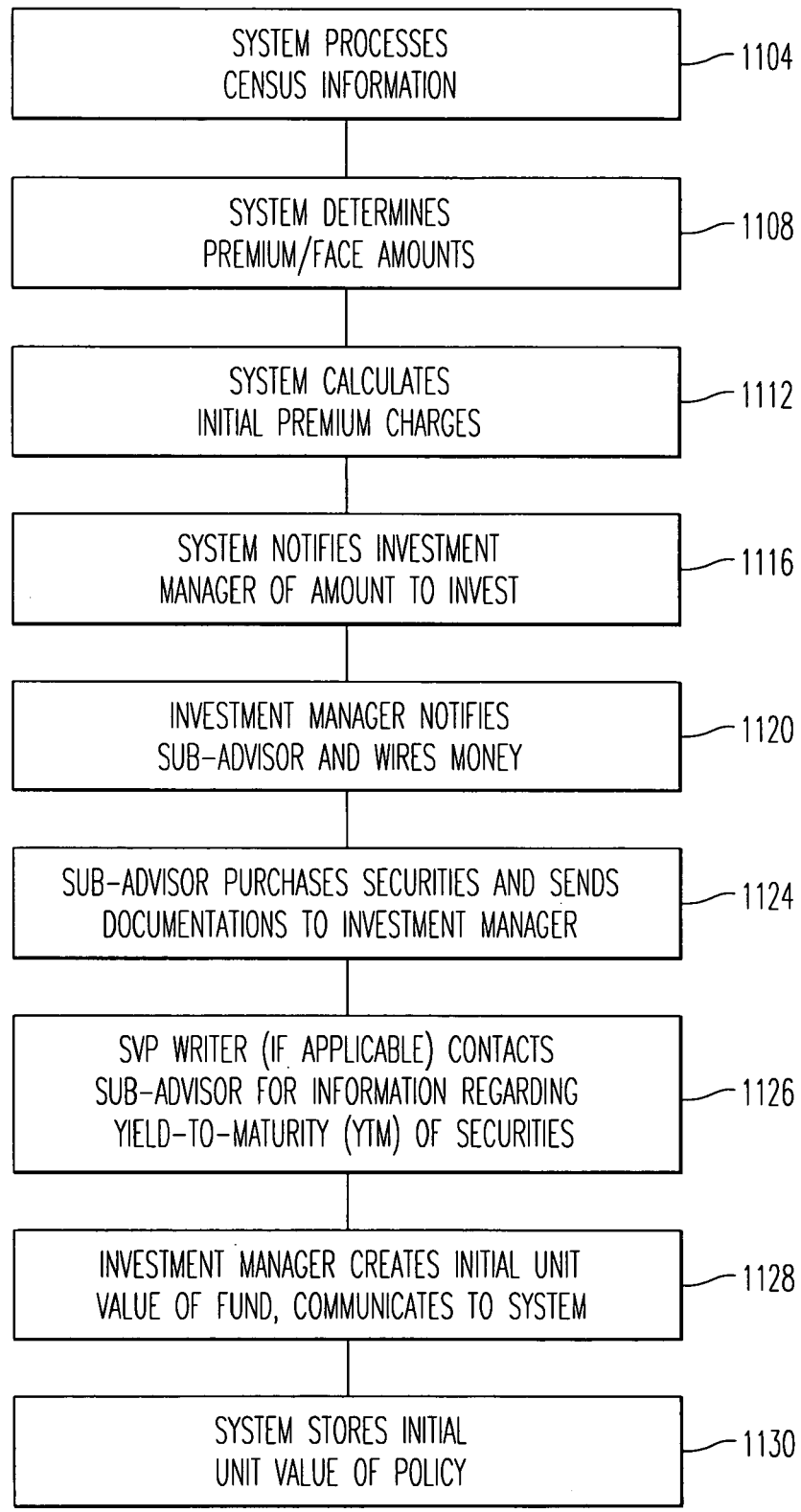
FIG. 11 is a flowchart showing the operation of the present invention when a fund is created.

Another system designed according to the present invention is used to track, reconcile and administer the values of life insurance policies in separate accounts, including Stable Value Protected funds. Each separate account contains divisions which correspond to the investment choices of a particular company, and each insurance policy for each of the employees working for the company making the investment may choose an investment. The system gathers information when a fund is created to ensure that the insurance policies issued by an insurance carrier to cover a fund participant conform to government and insurance regulations. As shown in FIG. 11, in step 1104, initially the system processes census information about a fund participant, including the participant's birth data, name, sex and social security number. Based on this information, tax information and the specific parameters of the selected insurance policy, in step 1108, the system determines premiums for the participant and a face amount for the policy assigned to the participant. The system of the present invention calculates the face amount for the assigned policy, as well as 7 Pay premiums and guideline premiums for 7702 and 7702A compliance.

In step 1112, the system also calculates initial premium charges based on premium taxes, DAC taxes, DAC refunds, loads, administration fees and the cost of the insurance. The premium and DAC taxes and the loads are calculated as a percentage of the premium, and the DAC refunds are calculated as a percentage of current and previous premiums paid. In addition, administration costs and cost of insurance amounts are calculated. Typically, the administration costs are flat costs per policy, while the cost of insurance is a factor times the Net amount of Risk. This factor is based on the mortality rate for the employees who are covered by the insurance policies in the fund, and this factor is a published factor which the system can use to track investments. Typically, this factor includes both the percentage needed to cover the policy value when an insured person dies and an extra percentage which represents potential profit for the insurance provider.

In step 1116, after the above calculations have been made, the system receives a notification from the insurance carrier of the payment required to cover the policy, and notifies the investment manager of an amount to invest. Processing then continues with step 1120. In step 1120, the system notifies any sub-advisers and transfers the payment to the sub-advisers. Then the sub-advisers purchase securities and report the result back to the system of the present invention in step 1124. Documentation, e.g., confirmations of buy and/or sell requests, are sent to the investment manager to indicate that the securities have been purchased or sold as requested.

When investing in an SVP fund in which an SVP writer is used, the SVP writer contacts the sub-adviser to request information regarding yield-to-maturity (YTM) of the purchased securities, as shown in step 1126. Using the YTM information, the SVP writer can set the initial targeted return to the YTM plus any adjustments agreed upon by the policy owner and the SVP writer. The system then imports the YTM from the sub-adviser and imports the initial credit rate information and the adjusted credit rate information from the SVP writer in addition to receiving the agreed upon adjustments from the investment manager. The system uses this information to calculate and compare the targeted return and applicable time period versus what was reported by the SVP writer. Any discrepancies are reported to the SVP writer and confirmation of the correct targeted return is reported to the policy owner.

Based on these calculations and comparisons, in step 1128, an initial unit value of the new fund is set and, in step 1130, the system stores the initial unit value of the policy.

Figure 12:
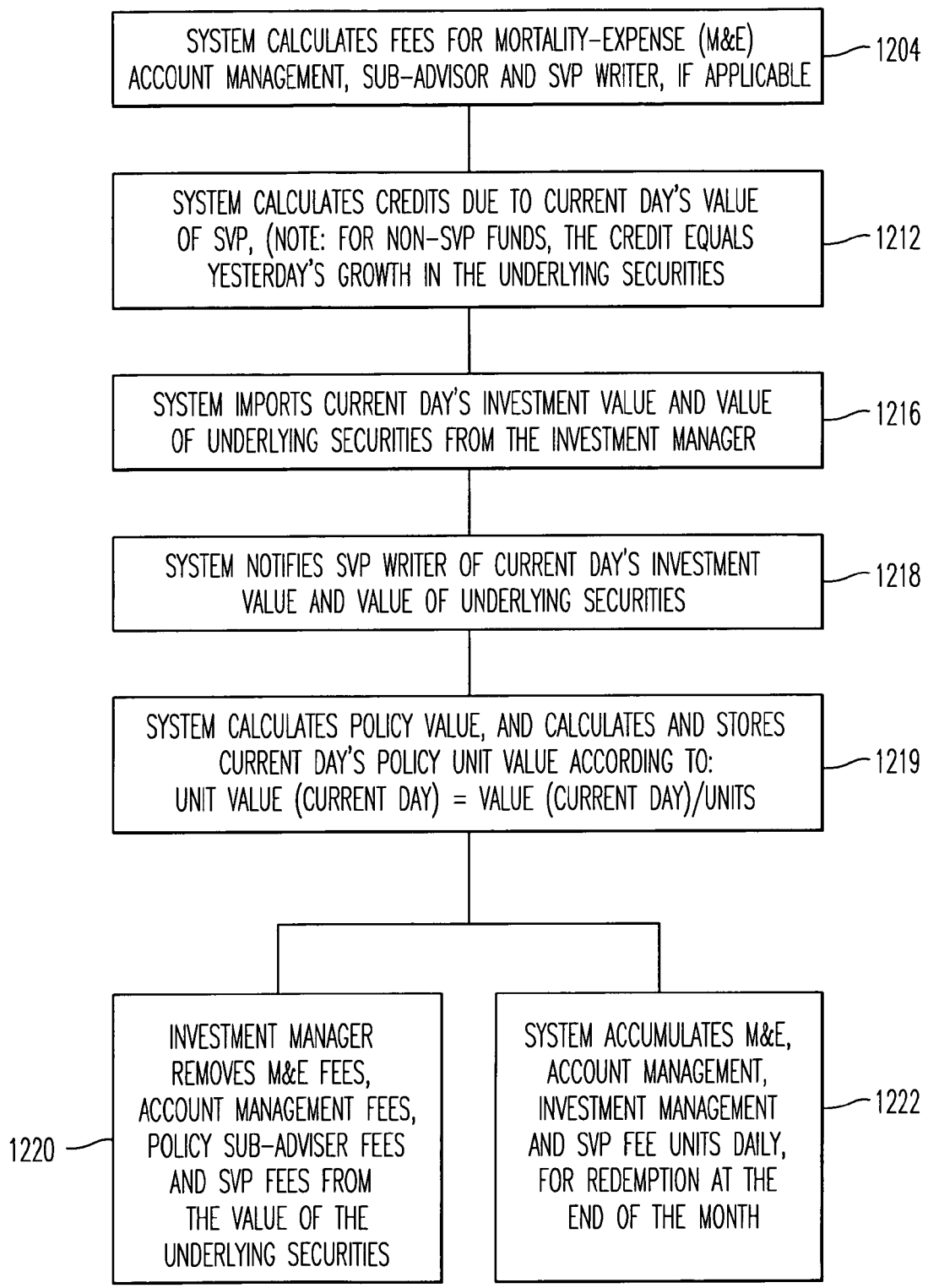
FIG. 12 is a flowchart showing the operation of the present invention on a daily basis.

In addition to the processing steps required to create or initialize a fund, processing is required at regular intervals to track existing funds. The processing steps shown in FIG. 12 are repeated frequently, e.g., daily, to support all of the available funds, including the Stable Value Protected funds, but the actual time between processing steps may be adjusted on a frequent or daily basis, step 1204 is performed to calculate the actual fees for Mortality and Expense (M&E) account management by the investment manager, sub-adviser and SVP writer, if applicable. The investment manager, sub-adviser and SVP writer and other entities that help to manage a fund each are members of a group called collectively hereafter a management group. The number of members of the management group depends on how the fund is managed. The M&E fee is calculated as W basis points per year divided by 365 multiplied by the investment value of the prior day. The account management fee is calculated as X basis points per year divided by 365 multiplied by the investment value of the prior day. The sub-adviser's fee is calculated as Y basis points per year divided by 365 multiplied by the investment value of the prior day, and the SVP writer's fee is calculated as Z basis points per year divided by 365 multiplied by the investment value of the prior day. These values are calculated by the system of the present invention to track the daily value of the funds.

In steps 1212 and 1216, the system calculates credits due to the targeted return and a present daily investment value. The system imports the daily investment value from the investment manager and compares it with the investment value due according to the policy. Any discrepancies are reported. In step 1218, the system notifies the SVP writer of the current day's investment value and the value of the underlying securities.

After step 1219, the system can pass control to either step 1220 or 1222 depending on how the system is configured. Step 1220 provides the management group with their credits right away, and step 1222 delays payment for a given period. In step 1220, the investment manager removes M&E fees, account management fees, "policy" sub-adviser fees and SVP fees, when applicable, from the value of the underlying securities for the present day and then moves the money to funds designated by fee recipients. The system also imports, in step 1220, the value of the underlying securities from the investment manager, that is the value before and after the reduction due to fees. The system additionally calculates an independent estimate of the value of the securities and compares it with the imported value. Discrepancies are reported to the policy owner. Alternatively, from step 1219, control could be passed to step 1222 so that each fee receiving entity may purchase "fee units" each day and accumulate them for a given period, e.g., until the end of the month.

In step 1219, the system calculates a policy value according to the formula: policy value for the present day equals policy value of the previous day multiplied by (investment unit value for the present day divided by investment unit value for the previous day). The system stores the policy value for the present day. Further, in step 1219, the system calculates the policy unit value for the present day according to the formula: policy unit value for the present day equals policy value of the present day divided by the number of units held. The system stores the policy unit value.

As shown in FIG. 13, at the end of a first time period, e.g., at the end of each month, the accumulated M&E fee units which were aggregated are processed. In step 1304, the system sells accumulated M&E fee units to the investment manager at the investment unit value for the present day on behalf of the carrier, Account Manager, SVP writer and sub-adviser, and the investment manager adjusts the number of investment units held by the system. The system imports the units adjusted from the investment manager and independently calculates the number of units to be sold. The reported units and independently calculated units are compared and any discrepancies are reported to the investment manager. Further, if "fee units" were accumulated above in step 1222, then the account manager, SVP writer and sub-advisor sell "fee units" to the investment manager at the investment unit value for the present day. In step 1308, the investment manager then adjusts the number of investment units held by each (i.e., the carrier, the account manager, SVP writer and sub-advisor collect their accrued fees). Also, if fee units were purchased, then the investment manager removes the value of the "fee units" from the value of the underlying securities and transfers cash to the account manager, SVP writer and sub-advisor. The system imports the value of the securities transferred and independently calculates the value of the securities transferred. The system compares the reported and independently calculated values of the securities and reports any discrepancies to the investment manager.

As shown in FIG. 14, various accounting procedures need to be performed at the end of a second time period, e.g., on the monthly anniversary of the creation of the policy. In step 1404, the policy owners sell policy units to the system to pay for monthly Costs of Insurance (COI) fees and administration fees. Based on the policy units sold, the system adjusts the number of policy units held by the policy holder. The system stores the COI value along with the amount of the administration fees and the number of policy units adjusted. In step 1408, the system sells an equivalent dollar amount of investment units to the investment manager, and the system adjusts the number of investment units held by the system. The system imports the adjusted number of units from the investment manager and independently calculates the number of units according to the value of the fees. The calculated units are compared with the reported units and any discrepancies are reported to the investment manager.

In step 1412, the account manager (insurance carrier) removes the value of the COI and administration fees from the value of the underlying securities and transfers cash to the system. The system imports the value of the underlying securities prior to and subsequent to removal of fees by the investment manager, and the system calculates the value of the underlying securities after the fees have been removed. The system then compares the reported value of the underlying securities with the calculated value of the underlying securities and any discrepancies are reported to the investment manager.

In step 1416, the system calculates an ongoing mortality reserve activity including cost of insurance, retention and contribution to mortality reserve. The system calculates the cost of insurance, retention and contribution to mortality reserve.

Figure 15:
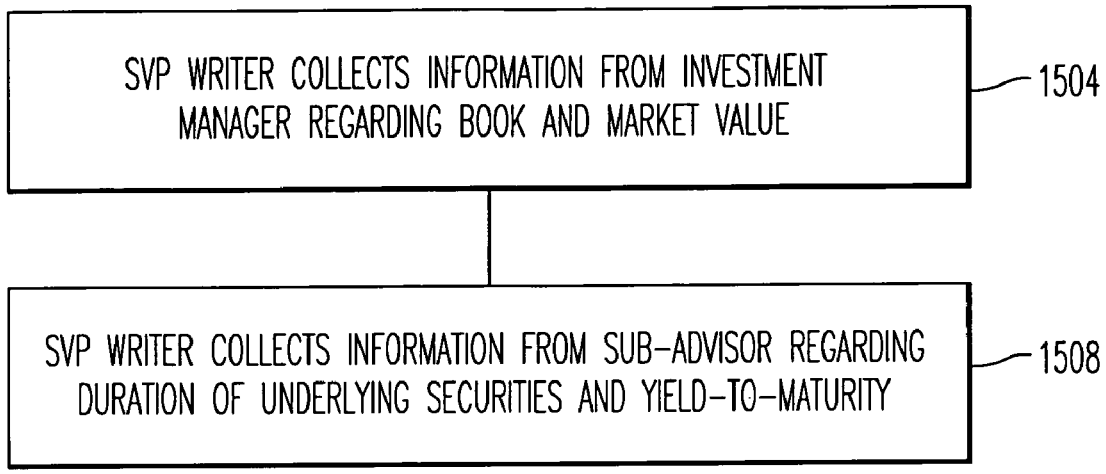
FIG. 15 is a flowchart showing the operation of the present invention on a quarterly basis on the last day of the second month of the quarter.

As shown in FIG. 15, at the end of a third time period, e.g., on the last day of the second month of the quarter, the system of the present invention collects and processes additional information from the investment manager and any sub-advisors. In step 1504, from the investment manager, the SVP writer collects information regarding the book value and market value of funds, the value of underlying securities and the investment value of the funds. This information is imported by the system of the present invention, and the system then compares the stored value of the underlying securities with the investment value. Any discrepancies are reported to the investment manager. In step 1508, the SVP writer collects information from a sub-advisor regarding duration of the underlying securities and the yield-to-maturity. The system then imports the duration of securities and yield-to-maturity from the SVP writer. The system independently calculates the duration and yield-to-maturity of the stored securities and compares the calculated and reported duration and YTM. Any discrepancies are reported to the SVP writer.

Figure 16:
FIG. 16 is a flowchart showing the operation of the present invention on a quarterly basis ten days prior to the beginning of a quarter.

As shown in FIG. 16, at the end of a third time period, e.g., ten days prior to the beginning of the quarter, additional processing is performed for SVP funds. As shown in step 1604, the SVP writer calculates targeted return for the upcoming quarter, and the system imports the calculated rate from the SVP writer. The system then calculates the targeted return based on the stored duration and YTM, and the calculated targeted return is compared with the reported targeted return. Any discrepancies between the two targeted returns are reported to the SVP writer.

Figure 17:
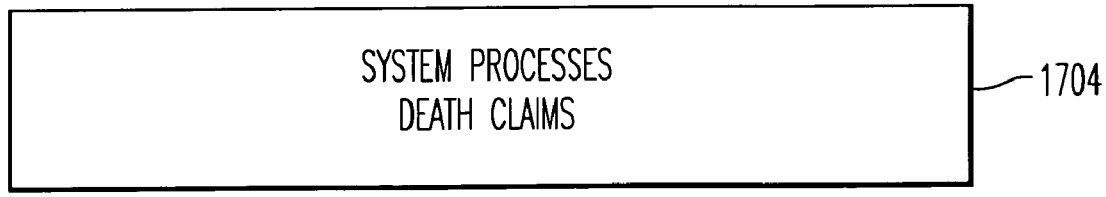
FIG. 17 is a flowchart showing the operation of the present invention upon the death of an insured fund participant.

FIG. 17 is a flowchart which shows the single processing step, 1704, involved upon the death of an insured fund participant. The system processes the death claim by calculating the net amount at risk, the cash values released, the interest from date of death, the adjustments to each individual fund (with aggregate policies) including COI charges from date of death and administration charges. The system stores the policy data.

Obviously, numerous modifications and variations of the present invention are possible in light of the above teachings (i.e., types of assets are interchangeable between the Defined Contribution and Defined Benefit plans). It is therefore to be understood that within the scope of the appended claims, the invention may be practiced otherwise than as specifically described herein.

What is claimed is:

1. A life insurance policy management system comprising:
   a policy generator for generating a life insurance policy including a stable value protected investment with an initial value based on a value of underlying securities of the stable value protected investment;
   a fee calculator for calculating fees for members of a management group which manage the life insurance policy;
   a credit calculator for calculating credits for the stable value protected investment of the life insurance policy;
   an investment calculator for determining an investment value and a value of the underlying securities of the stable value protected investment for the current day;
   a policy calculator for calculating a policy value and a policy unit value for the current day;
   digital storage for storing the policy unit value for the current day; and
   a debitor for removing a value of the fees for members of the management group which manages the life insurance policy.

2. The system according to claim 1, wherein the policy generator comprises:
   a premium calculator for determining premium amounts and additional premium charges;
   an investor for investing a specified amount of money; and
   an initial value calculator for calculating an initial unit value of the life insurance policy, wherein the initial unit value of the life insurance policy is stored in the digital memory.

3. The system of claim 2, further comprising:
   means for notifying an investment manager of an amount of money to invest;
   means for notifying a sub-adviser of the amount to invest;
   means for wiring money to the sub-adviser;
   means for purchasing securities; and
   means for sending documentation to the investment manager.

4. The system of claim 1, further comprising:
   notifying means for notifying a stable value protected investment writer of the investment value and the value of the underlying securities of the stable value protected investment for the current day.

5. The system of claim 1, further comprising:
   a cash transferrer for transferring cash to the members of the management group based on fees due to the members of the management group.

6. The system according to claim 1, further comprising:
   selling means for selling policy units held by a policy owner to the investment manager system to pay for cost of insurance fees and administration fees;
   adjusting means for adjusting a number of policy units held by the policy owner; selling means for selling the number of policy units adjusted by the adjusting means;
   removing means for removing from the underlying securities a value equivalent to the number of policy units adjusted by the adjusting means;
   transferring means for transferring cash to a carrier; and
   mortality calculating means for calculating ongoing mortality reserve activity.

7. The system according to claim 1, further comprising:
   a data collector for collecting information from sub-advisers on a duration and yield-to-maturity of the underlying securities of the stable value protected investment.

8. A system according to claim 1, further comprising a calculator for calculating a targeted return for an upcoming time period.

9. A method for managing a life insurance policy comprising:
   generating a life insurance policy including a stable value protected investment with an initial value based on a value of underlying securities of the stable value protected investment;
   calculating fees for members of a management group which manage the life insurance policy;
   calculating credits for the stable value protected investment of the life insurance policy;
   determining an investment value and a value of the underlying securities of the stable value protected investment for the current day;
   calculating a policy value and a policy unit value for the current day;
   storing the policy unit value for the current day; and
   removing a value of the fees for members of the management group which manage the life insurance policy.

10. The method according to claim 9, wherein the step of generating a policy comprises:
    determining premium amounts;
    determining additional premium charges;
    investing a specified amount of money;
    calculating an initial unit value of the life insurance policy; and
    storing the initial unit value of the life insurance policy.

11. The method of claim 10, wherein the step of investing comprises:
    notifying an investment manager of an amount of money to invest;
    notifying a sub-adviser of the amount to invest;
    wiring money to the sub-advisers;
    purchasing securities; and
    sending documentation to the investment manager.

12. The method of claim 9, further comprising the step of notifying a stable value protected investment writer of the investment value and the value of the underlying securities of the stable value protected investment for the current day.

13. The method of claim 9, wherein removing the value of the fees comprises:
   transferring cash to the members of the management group based on the fees owed to the members of the management group.

14. The method according to claim 9, further comprising the steps of:
   selling policy units held by a policy owner to the investment manager to pay for cost of insurance fees and administration fees;
   adjusting a number of policy units held by the policy owner;
   selling the number of policy units adjusted in the adjusting step;
   removing from the underlying securities a value equivalent to the number of policy units adjusted in the adjusting step;
   transferring cash to a carrier; and
   calculating ongoing mortality reserve activity.

15. The method according to claim 9, further comprising the step of:
   collecting information from sub-advisers on a duration and yield-to-maturity of the underlying securities of the stable value protected investment.

16. The method for according to claim 9, further comprising the step of calculating a targeted return for a time period.

17. The method according to claim 9, wherein the steps of claim 9 are performed by a computer.

18. A computer readable media for controlling a computer to perform the steps of:
   generating a life insurance policy including a stable value protected investment with an initial value based on a value of underlying securities of the stable value protected investment;
   calculating fees for members of a management group which manage the life insurance policy;
   calculating credits for the stable value protected investment of the life insurance policy;
   determining an investment value and a value of the underlying securities of the stable value protected investment for the current day;
   calculating a policy value and a policy unit value for the current day;
   storing the policy unit value for the current day; and
   removing the fees for members of the management group which manage the life insurance policy.

19. A computer system for administering an existing life insurance policy, including a stable value protected investment based on underlying securities of the stable value protected investment, the computer system comprising:
   a credit calculator for calculating credits for the stable value protected investment of the life insurance policy;
   an investment calculator for determining an investment value and a value of the underlying securities of the stable value protected investment for the current day;
   a policy value calculator for calculating a policy value and a policy unit value for the current day; and
   digital storage for storing at least one of the policy value and the policy unit value for the current day.

20. The system as claimed in claim 19, further comprising a fee calculator for calculating fees for members of a management group which manage the life insurance policy.

21. The system as claimed in claim 20, further comprising a debitor for removing a value of the fees for members of the management group which manages the life insurance policy.

22. The system as claimed in claim 20, further comprising an accumulator for accumulating fees on behalf of the management group.

23. The system as claimed in claim 19, further comprising notifying means for notifying a stable value protected investment writer of the investment value and the value of the underlying securities of the stable value protected investment for the current day.

24. The system as claimed in claim 20, further comprising a cash transferrer for transferring cash to the members of the management group based on the fees owed to the members of the management group.

25. The system as claimed in claim 20, further comprising:
   selling means for selling policy units held by a policy owner to an investment manager system to pay for cost of insurance fees and administration fees;
   adjusting means for adjusting a number of policy units held by the policy owner;
   selling means for selling the number of policy units adjusted by the adjusting means;
   removing means for removing from the underlying securities a value equivalent to the number of policy units adjusted by the adjusting means;
   transferring means for transferring cash to a carrier; and
   mortality calculating means for calculating ongoing mortality reserve activity.

26. The system as claimed in claim 19, further comprising means for collecting information from sub-advisers on a duration and yield-tomaturity of the underlying securities of the stable value protected investment.

27. A system as claimed in claim 19, further comprising a calculator for calculating a targeted return for an upcoming time period.

28. A method for managing a life insurance policy, including a stable value protected investment based on underlying securities of the stable value protected investment, the method comprising the steps of:
   (a) calculating credits for the stable value protected investment of the life insurance policy;
   (b) determining an investment value and a value of the underlying securities of the stable value protected investment for the current day;
   (c) calculating a policy value and a policy unit value for the current day; and
   (d) storing at least one of the policy value and the policy unit value for the current day.

29. The method as claimed in claim 28, further comprising calculating fees for members of a management group which manage the life insurance policy.

30. The method as claimed in claim 29, further comprising removing the fees for members of the management group which manage the life insurance policy.

31. The method as claimed in claim 29, further comprising accumulating fees on behalf of the management group.

32. The method as claimed in claim 29, further comprising the step of notifying a stable value protected investment writer of the investment value and the value of the underlying securities of the stable value protected investment for the current day.

33. The method as claimed in claim 29, further comprising:

transferring cash to the members of the management group based on fees owed to the members of the management group.

34. The method as claimed in claim 28, further comprising the steps of:
    selling policy units held by a policy owner to an investment manager to pay for cost of insurance fees and administration fees;
    adjusting a number of policy units held by the policy owner;
    selling the number of policy units adjusted in the adjusting step;
    removing from the underlying securities a value equivalent to the number of policy units adjusted in the adjusting step;
    transferring cash to a carrier; and
    calculating ongoing mortality reserve activity.

35. The method as claimed in claim 28, further comprising the step of collecting information from sub-advisers on a duration and yield-to-maturity of the underlying securities of the stable value protected investment.

36. The method as claimed in claim 28, further comprising the step of calculating a targeted return for a time period.

37. The method as claimed in claim 28, wherein the steps (a)-(d) are performed by a computer.

38. The method according to claim 9, wherein the step of determining the investment value and a value of the underlying securities of the stable value protected investment for the current day comprises adjusting the investment value to amortize for at least one initial fee.

39. The method according to claim 38, wherein the at least one fee comprises at least one of a premium tax, a DAC tax, and a load.

40. The method according to claim 28, wherein the step of determining the investment value and a value of the underlying securities of the stable value protected investment for the current day comprises adjusting the investment value to amortize for at least one initial fee.

41. The method according to claim 40, wherein the at least one fee comprises at least one of a premium tax, a DAC tax, and a load.

42. A life insurance policy management system comprising:
    a policy generator for generating a life insurance policy including a stable value protected investment with an initial value based on a value of underlying securities of the stable value protected investment;
    a fee calculator for calculating fees for members of a management group which manage the life insurance policy;
    a credit calculator for calculating credits for the stable value protected investment of the life insurance policy;
    an investment calculator for determining an investment value and a value of the underlying securities of the stable value protected investment for the current day;
    a policy calculator for calculating a policy value and a policy unit value for the current day;
    digital storage for storing the policy unit value for the current day; and
    an accumulator for accumulating fees on behalf of the management group.

43. The system according to claim 42, wherein policy generator comprises:
    a premium calculator for determining premium amounts and additional premium charges;
    an investor for investing a specified amount of money; and
    an initial value calculator for calculating an initial unit value of the life insurance policy, wherein the initial unit value of the life insurance policy is stored in the digital memory.

44. The system of claim 43, further comprising:
    means for notifying an investment manager of an amount of money to invest;
    means for notifying a sub-adviser of the amount to invest;
    means for wiring money to the sub-adviser;
    means for purchasing securities; and
    means for sending documentation to the investment manager.

45. The system of claim 42, further comprising:
    notifying means for notifying a stable value protected investment writer of the investment value and the value of the underlying securities of the stable value protected investment for the current day.

46. The system of claim 42, further comprising:
    a cash transferrer for transferring cash to the members of the management group based on fees due to the members of the management group.

47. The system according to claim 42, further comprising:
    selling means for selling policy units held by a policy owner to the investment manager system to pay for cost of insurance fees and administration fees;
    adjusting means for adjusting a number of policy units held by the policy owner;
    selling means for selling the number of policy units adjusted by the adjusting means;
    removing means for removing from the underlying securities a value equivalent to the number of policy units adjusted by the adjusting means;
    transferring means for transferring cash to a carrier; and
    mortality calculating means for calculating ongoing mortality reserve activity.

48. The system according to claim 42, further comprising:
    a data collector for collecting information from sub-advisers on a duration and yield-to-maturity of the underlying securities of the stable value protected investment.

49. A system according to claim 42, further comprising a calculator for calculating a targeted return for an upcoming time period.

50. The system according to claim 42, wherein the investment calculator comprises an adjuster for adjusting the investment value to amortize for at least one initial fee.

51. The system according to claim 50, wherein the at least one fee comprises at least one of a premium tax, a DAC tax, and a load.

52. A method for managing a life insurance policy comprising:
    generating a life insurance policy including a stable value protected investment with an initial value based on a value of underlying securities of the stable value protected investment;
    calculating fees for members of a management group which manage the life insurance policy;
    calculating credits for the stable value protected investment of the life insurance policy;
    determining an investment value and a value of the underlying securities of the stable value protected investment for the current day;
    calculating a policy value and a policy unit value for the current day;
    storing the policy unit value for the current day; and
    accumulating fees on behalf of the management group for managing the life insurance policy.

53. The method according to claim 52, wherein the step of generating a policy comprises:
determining premium amounts;
determining additional premium charges;
investing a specified amount of money;
calculating an initial unit value of the life insurance policy; and
storing the initial unit value of the life insurance policy.

54. The method of claim 53, wherein the step of investing comprises:
notifying an investment manager of an amount of money to invest;
notifying a sub-adviser of the amount to invest;
wiring money to the sub-advisers;
purchasing securities; and
sending documentation to the investment manager.

55. The method of claim 52, further comprising the step of notifying a stable value protected investment writer of the investment value and the value of the underlying securities of the stable value protected investment for the current day.

56. The method of claim 52, wherein removing the value of the fees comprises:
transferring cash to the members of the management group based on the fees owed to the members of the management group.

57. The method according to claim 52, further comprising the steps of:
selling policy units held by a policy owner to the investment manager to pay for cost of insurance fees and administration fees;
adjusting a number of policy units held by the policy owner;
selling the number of policy units adjusted in the adjusting step;
removing from the underlying securities a value equivalent to the number of policy units adjusted in the adjusting step;
transferring cash to a carrier; and
calculating ongoing mortality reserve activity.

58. The method according to claim 52, further comprising the step of:
collecting information from sub-advisers on a duration and yield-to-maturity of the underlying securities of the stable value protected investment.

59. The method for according to claim 52, further comprising the step of calculating a targeted return for a time period.

60. The method according to claim 52, wherein the steps of claim 52 are performed by a computer.

61. The method according to claim 52, wherein the investment calculator comprises an adjuster for adjusting the investment value to amortize for at least one initial fee.

62. The method according to claim 61, wherein the at least one fee comprises at least one of a premium tax, a DAC tax, and a load.

63. A computer readable media for controlling a computer to perform the steps of:
generating a life insurance policy including a stable value protected investment with an initial value based on a value of underlying securities of the stable value protected investment;
calculating fees for members of a management group which manage the life insurance policy;
calculating credits for the stable value protected investment of the life insurance policy;
determining an investment value and a value of the underlying securities of the stable value protected investment for the current day;
calculating a policy value and a policy unit value for the current day;
storing the policy unit value for the current day; and
accumulating fees on behalf of the management group for managing the life insurance policy.

64. The computer readable medium according to claim 63, wherein the step of determining the investment value and a value of the underlying securities of the stable value protected investment for the current day comprises adjusting the investment value to amortize for at least one initial fee.

65. The computer readable medium according to claim 64, wherein the at least one fee comprises at least one of a premium tax, a DAC tax, and a load.

66. The system according to claim 8, wherein the targeted return is adjusted to amortize at least one initial fee.

67. The system according to claim 1, further comprising a receiver for receiving a targeted return for an upcoming time period.

68. The system according to claim 67, wherein the targeted return is adjusted to amortize at least one initial fee.

69. The method according to claim 16, wherein the targeted return is adjusted to amortize at least one initial fee.

70. The method according to claim 9, further comprising receiving a targeted return for an upcoming time period.

71. The method according to claim 70, wherein the targeted return is adjusted to amortize at least one initial fee.

72. The computer readable media according to claim 18, further controlling the computer to perform the step of calculating a targeted return for an upcoming time period, wherein the targeted return is adjusted to amortize at least one initial fee.

73. The computer readable media according to claim 18, further controlling the computer to perform the step of receiving a targeted return for an upcoming time period.

74. The computer readable media according to claim 73, wherein the targeted return is adjusted to amortize at least one initial fee.

75. The system according to claim 27, wherein the targeted return is adjusted to amortize at least one initial fee.

76. The system according to claim 19, further comprising a receiver for receiving a targeted return for an upcoming time period.

77. The system according to claim 76, wherein the targeted return is adjusted to amortize at least one initial fee.

78. The method according to claim 36, wherein the targeted return is adjusted to amortize at least one initial fee.

79. The method according to claim 28, further comprising receiving a targeted return for an upcoming time period.

80. The method according to claim 79, wherein the targeted return is adjusted to amortize at least one initial fee.

81. The system according to claim 49, wherein the targeted return is adjusted to amortize at least one initial fee.

82. The system according to claim 42, further comprising a receiver for receiving a targeted return for an upcoming time period.

83. The system according to claim 82, wherein the targeted return is adjusted to amortize at least one initial fee.

84. The method according to claim 59, wherein the targeted return is adjusted to amortize at least one initial fee.

85. The method according to claim 52, further comprising receiving a targeted return for an upcoming time period.

86. The method according to claim 85, wherein the targeted return is adjusted to amortize at least one initial fee.

87. The system according to claim 1, wherein the investment calculator comprises an adjuster for adjusting the investment value to amortize for at least one initial fee.

88. The system according to claim 87, wherein the at least one fee comprises at least one of a premium tax, a DAC tax, and a load.

89. The computer readable media according to claim 18, wherein the step of determining the investment value and a value of the underlying securities of the stable value protected investment for the current day comprises adjusting the investment value to amortize for at least one initial fee.

90. The computer readable media according to claim 89, wherein the at least one fee comprises at least one of a premium tax, a DAC tax, and a load.

91. The system according to claim 19, wherein the investment calculator comprises an adjuster for adjusting the investment value to amortize for at least one initial fee.

92. The system according to claim 91, wherein the at least one fee comprises at least one of a premium tax, a DAC tax, and a load.

93. The computer readable media according to claim 63, further controlling the computer to perform the step of calculating a targeted return for an upcoming time period, wherein the targeted return is adjusted to amortize at least one initial fee.

94. The computer readable media according to claim 63, further controlling the computer to perform the step of receiving a targeted return for an upcoming time period.

95. The computer readable media according to claim 94, wherein the targeted return is adjusted to amortize at least one initial fee.

96. The system according to claim 1, further comprising a receiver for receiving an investment value.

97. The system according to claim 96, wherein the received investment value is adjusted to amortize at least one initial fee.

98. The method according to claim 9, further comprising receiving an investment value.

99. The method according to claim 98, wherein the received investment value is adjusted to amortize at least one initial fee.

100. The computer readable media according to claim 18, further controlling the computer to perform the step of receiving an investment value.

101. The computer readable media according to claim 100, wherein the received investment value is adjusted to amortize at least one initial fee.

102. The system according to claim 19, further comprising a receiver for receiving an investment value.

103. The system according to claim 102, wherein the received investment value is adjusted to amortize at least one initial fee.

104. The method according to claim 28, further comprising receiving an investment value.

105. The method according to claim 104, wherein the received investment value is adjusted to amortize at least one initial fee.

106. The system according to claim 42, further comprising a receiver for receiving an investment value.

107. The system according to claim 106, wherein the received investment value is adjusted to amortize at least one initial fee.

108. The method according to claim 52, further comprising receiving an investment value.

109. The method according to claim 108, wherein the received investment value is adjusted to amortize at least one initial fee.

110. The computer readable media according to claim 63, further controlling the computer to perform the step of receiving an investment value.

111. The computer readable media according to claim 110, wherein the received investment value is adjusted to amortize at least one initial fee.

\* \* \* \* \*